United States Patent
Oku et al.

(10) Patent No.: US 11,841,611 B2
(45) Date of Patent: Dec. 12, 2023

(54) PROJECTOR

(71) Applicant: SEIKO EPSON CORPORATION, Tokyo (JP)

(72) Inventors: Tatsuya Oku, Matsumoto (JP); Norikazu Kadotani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/954,672

(22) Filed: Sep. 28, 2022

(65) Prior Publication Data

US 2023/0102817 A1 Mar. 30, 2023

(30) Foreign Application Priority Data

Sep. 29, 2021 (JP) ................. 2021-158907

(51) Int. Cl.
  *G03B 21/16* (2006.01)
  *G03B 21/00* (2006.01)
  *G03B 21/20* (2006.01)

(52) U.S. Cl.
  CPC ........... *G03B 21/16* (2013.01); *G03B 21/006* (2013.01); *G03B 21/208* (2013.01); *G03B 21/2073* (2013.01)

(58) Field of Classification Search
  CPC ... G03B 21/16; G03B 21/006; G03B 21/2073
  USPC ........................................................ 353/57
  See application file for complete search history.

(56) References Cited

U.S. PATENT DOCUMENTS

2002/0018183 A1    2/2002  Ito et al.

FOREIGN PATENT DOCUMENTS

| CN | 114563902 A | * | 5/2022 |
| JP | 2002-23109 A | | 1/2002 |
| JP | 2003177468 A | * | 6/2003 |
| JP | 2003337380 A | * | 11/2003 |

OTHER PUBLICATIONS

Translation CN 114563902 (Year: 2023).*
Translation JP 2003337380 (Year: 2023).*
Translation JP 2003241313 (Year: 2023).*

* cited by examiner

*Primary Examiner* — Jerry L Brooks
(74) *Attorney, Agent, or Firm* — Oliff PLC

(57) ABSTRACT

A projector includes a light source device, a homogenization optical element, a polarization conversion element, a liquid crystal panel, an incident side polarization plate, an exit side polarization plate, a projection optical system, a first housing, a second housing, a first heat-transfer section, a second heat-transfer section, a first fan configured to feed an air current toward the first heat-transfer section and the second heat-transfer section, and a first duct in which the first heat-transfer section and the second heat-transfer section are disposed.

18 Claims, 13 Drawing Sheets

PROJECTOR

The present application is based on, and claims priority from JP Application Serial Number 2021-158907, filed Sep. 29, 2021, the disclosure of which is hereby incorporated by reference herein in its entirety.

BACKGROUND

1. Technical Field

The present disclosure relates to a projector.

2. Related Art

Ina projector described in JP-A-2002-23109, cooling fans are disposed individually to heat generators such as liquid crystal panels or optical elements to thereby arrange to efficiently cool the heat generators.

However, since in the projector described above, the number of the cooling fans becomes large, there is a problem that it becomes difficult to reduce the device configuration in size.

SUMMARY

In view of the problems described above, according to a first aspect of the present disclosure, there is provided a projector including a light source device, a homogenization optical element configured to homogenize light emitted from the light source device, a polarization conversion element configured to align polarization of the light emitted from the homogenization optical element, at least one liquid crystal panel which the light emitted from the polarization conversion element enters, at least one incident side polarization plate disposed at a light incident side of the liquid crystal panel, at least one exit side polarization plate disposed at a light exit side of the liquid crystal panel, a projection optical system configured to project the light modulated by the liquid crystal panel, a first housing configured to house at least one of the liquid crystal pane, the incident side polarization plate and the exit side polarization plate in a sealed state, a second housing configured to house at least one of at least a part of the homogenization optical element and the polarization conversion element in a sealed state, a first heat-transfer section configured to receive heat from at least one of the liquid crystal panel, the incident side polarization plate, and the exit side polarization plate housed in the first housing, and configured to transfer the heat to an outside of the first housing, a second heat-transfer section configured to receive heat from at least one of at least a part of the homogenization optical element and the polarization conversion element housed in the second housing, and configured to transfer the heat to an outside of the second housing, a first fan configured to feed an air current toward the first heat-transfer section and the second heat-transfer section, and a first duct which extends from the first fan, and in which a part of the first heat-transfer section and a part of the second heat-transfer section are disposed.

According to a second aspect of the present disclosure, there is provided a projector including a light source device, a homogenization optical element configured to homogenize light emitted from the light source device, at least one light modulation panel which the light emitted from the homogenization optical element enters, a projection optical system configured to project the light modulated by the light modulation panel, a first housing configured to house the light modulation panel in a sealed state, a second housing configured to house at least a part of the homogenization optical element in a sealed state, a first heat-transfer section which is configured to receive heat from the light modulation panel, and which is configured to transfer the heat to an outside of the first housing, a second heat-transfer section which is configured to receive heat from the homogenization optical element housed in the second housing, and which is configured to transfer the heat to an outside of the second housing, a first fan configured to feed an air current toward the first heat-transfer section and the second heat-transfer section, and a first duct which extends from the first fan, and in which the first heat-transfer section and the second heat-transfer section are disposed.

DESCRIPTION OF EXEMPLARY EMBODIMENTS

Some embodiments of the present disclosure will hereinafter be described in detail with reference to the drawings.

It should be noted that the drawings used in the following description show characteristic parts in an enlarged manner in some cases for the sake of convenience in order to make the features easy to understand, and the dimensional ratios between the constituents and so on are not necessarily the same as actual ones.

First Embodiment

An example of a projector according to a first embodiment will be described.

Figure 1:
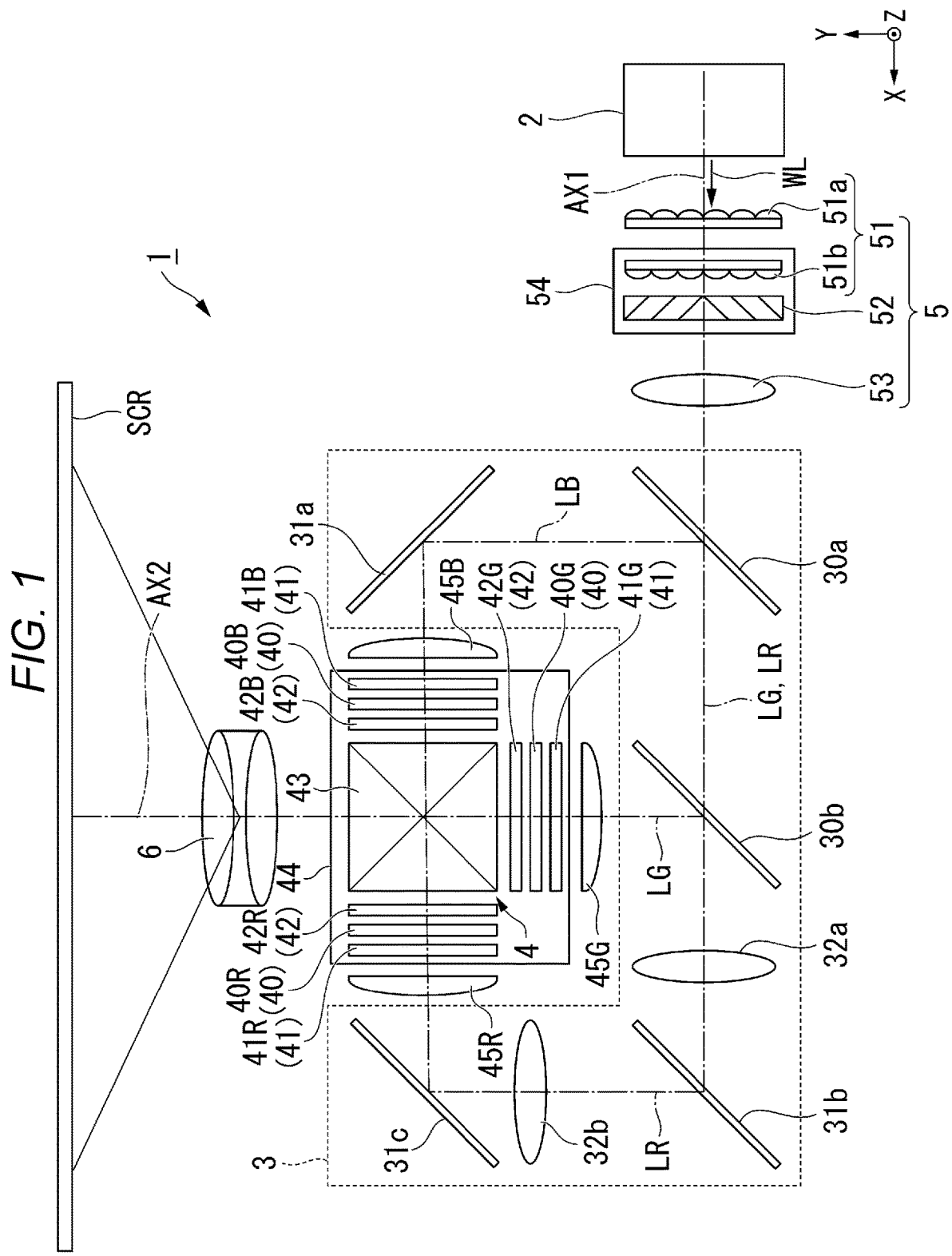
FIG. 1 is a diagram showing a schematic configuration of a projector according to a first embodiment.

FIG. 1 is a diagram showing a schematic configuration of the projector according to the present embodiment.

As shown in FIG. 1, the projector 1 according to the present embodiment is a projection-type image display device for displaying a color image on a screen SCR. The projector 1 is provided with a light source device 2, a color separation optical system 3, an image forming unit 4, a homogenous illumination unit 5, and a projection optical system 6.

In the present embodiment, the light source device 2 emits illumination light WL having a white color. A configuration of the light source device 2 will be described later. The illumination light WL having been emitted from the light source device 2 enters the color separation optical system 3 via the homogeneous illumination unit 5. The homogenous illumination unit 5 is a unit for homogenizing the intensity distribution of the illumination light WL in an illumination target area.

The homogenous illumination unit 5 includes a homogenization optical element 51, a polarization conversion element 52, and a superimposing lens 53. It should be noted that the details of a configuration of the homogenous illumination unit 5 will be described later.

In the following description, there is used an XYZ orthogonal coordinate system as needed.

In each of the drawings, an X-axis is an axis along an illumination light axis AX1 of the illumination light WL emitted from the light source device 2 toward the homogenous illumination unit 5. A Y axis is an axis perpendicular to the X axis, and is parallel to a direction in which the projection optical system 6 projects image light, namely an optical axis AX2 of the projection optical system 6. A Z axis is an axis perpendicular to the illumination light axis AX1 and the optical axis AX2.

Further, in the present embodiment, the description is presented assuming +Z as an "upper side," and −Z as a "lower side" in a direction along the Z axis. It should be noted that the upper side and the lower side are mere denotations for describing arrangement relationships between constituent members of the projector 1, but are not ones for defining actual installation postures or directions in the projector 1.

The color separation optical system 3 separates the illumination light WL having the white color from the light source device 2 into a red light beam LR, a green light beam LG, and a blue light beam LB. The color separation optical system 3 is provided with a first dichroic mirror 30a and a second dichroic mirror 30b, a first total reflection mirror 31a, a second total reflection mirror 31b, and a third total reflection mirror 31c, and a first relay lens 32a and a second relay lens 32b.

The first dichroic mirror 30a separates the illumination light WL having been emitted from the light source device 2 and then passed through the homogenous illumination unit 5 into the blue light beam LB, and the other light including the green light beam LG and the red light beam LR. The first dichroic mirror 30a reflects the blue light beam LB to be separated, and at the same time, transmits the other light. The second dichroic mirror 30b reflects the green light beam LG, and at the same time, transmits the red light beam LR.

The first total reflection mirror 31a reflects the blue light beam LB toward a blue-liquid crystal panel 40B described later. The second total reflection mirror 31b and the third total reflection mirror 31c guide the red light beam LR to a red-liquid crystal panel 40R described later. The green light beam LG is reflected by the second dichroic mirror 30b toward the green-liquid crystal panel 40G described later.

The first relay lens 32a is disposed between the second dichroic mirror 30b and the second total reflection mirror 31b in the light path of the red light beam LR. The second relay lens 32b is disposed between the second total reflection mirror 31b and the third total reflection mirror 31c in the light path of the red light beam LR.

The colored light beams obtained by the separation with the color separation optical system 3 enter the image forming unit 4.

The image forming unit 4 is provided with a plurality of liquid crystal panels 40, a plurality of incident side polarization plates 41, a plurality of exit side polarization plates 42, and a light combining element 43.

The plurality of liquid crystal panels 40 includes the blue-liquid crystal panel 40B, the green-liquid crystal panel 40G, and the red-liquid crystal panel 40R. The blue-liquid crystal panel 40B modulates the blue light beam LB in accordance with image information to form a blue image light beam. The green-liquid crystal panel 40G modulates the green light beam LG in accordance with the image information to form a green image light beam. The red-liquid crystal panel 40R modulates the red light beam LR in accordance with the image information to form a red image light beam. The blue-liquid crystal panel 40B, the green-liquid crystal panel 40G, and the red-liquid crystal panel 40R are hereinafter collectively referred to as liquid crystal panels 40B, 40G, and 40R, respectively.

The plurality of incident side polarization plates 41 includes a blue-incident side polarization plate 41B, a green-incident side polarization plate 41G, and a red-incident side polarization plate 41R. The blue-incident side polarization plate 41B is disposed at the light incident side of the blue-liquid crystal panel 40B. The green-incident side polarization plate 41G is disposed at the light incident side of the green-liquid crystal panel 40G. The red-incident side polarization plate 41R is disposed at the light incident side of the red-liquid crystal panel 40R. The blue-incident side polarization plate 41B, the green-incident side polarization plate 41G, and the red-incident side polarization plate 41R are hereinafter collectively referred to as incident side polarization plates 41B, 41G, and 41R, respectively.

The plurality of exit side polarization plates 42 includes a blue-exit side polarization plate 42B, a green-exit side polarization plate 42G, and a red-exit side polarization plate 42R. The blue-exit side polarization plate 42B is disposed at the light exit side of the blue-liquid crystal panel 40B. The green-exit side polarization plate 42G is disposed at the light exit side of the green-liquid crystal panel 40G. The red-exit side polarization plate 42R is disposed at the light exit side of the red-liquid crystal panel 40R. The blue-exit side polarization plate 42B, the green-exit side polarization plate 42G, and the red-exit side polarization plate 42R are hereinafter collectively referred to as exit side polarization plates 42B, 42G, and 42R, respectively.

Further, at the incident side of the incident side polarization plates 41B, 41G, and 41R, there are respectively disposed field lenses 45B, 45G, and 45R.

The image light beams respectively from the liquid crystal panels 40B, 40G, and 40R enter the light combining element 43. The light combining element 43 combines the image light beams with each other, and then emits the image light beams thus combined toward the projection optical system 6. As the light combining element 43, there is used, for example, a cross dichroic prism.

Subsequently, a specific configuration of the homogenous illumination unit 5 will be described.

The homogenization optical element 51 of the homogenous illumination unit 5 is constituted by, for example, a pair of lens arrays. Specifically, the homogenization optical element 51 is constituted by a first lens array 51a and a second lens array 51b. The lens arrays 31a, 31b are each constituted by a plurality of lenses arranged in an array.

The second lens array 51b forms an image of each of the lenses of the first lens array 51a in the vicinity of each of the image forming areas of the liquid crystal panels 40B, 40G, and 40R in cooperation with the superimposing lens 53.

The illumination light WL having passed through the homogenization optical element 51 enters the polarization conversion element 52. The polarization conversion element 52 is constituted by, for example, a polarization split film and a wave plate, and converts a polarization direction of the illumination light WL emitted from the homogenization optical element 51 into uniform linearly polarized light. In the case of the present embodiment, the polarization conversion element 52 converts the illumination light WL so as to become the linearly polarized light which can be transmitted through the incident side polarization plates 41B, 41G, and 41R. In such a manner, the light emitted from the polarization conversion element 52 enters the liquid crystal panels 40B, 40G, and 40R.

The illumination light WL having passed through the polarization conversion element 52 enters the superimposing lens 53. The superimposing lens 53 converges partial light beams emitted from the polarization conversion element 52 to superimpose the partial light beams on each other in the vicinity of each of the image forming areas of the respective liquid crystal panels 40B, 40G, and 40R to thereby homogenize the illuminance distribution in each of the image forming areas.

The image light beams combined by the light combining element 43 of the image forming unit 4 enter the projection optical system 6. The projection optical system 6 is constituted by a projection lens group, and projects the image light beams combined by the light combining element 43 toward the screen SCR in an enlarged manner. Thus, the color image enlarged is displayed on the screen SCR.

Light Source Device

Figure 2:
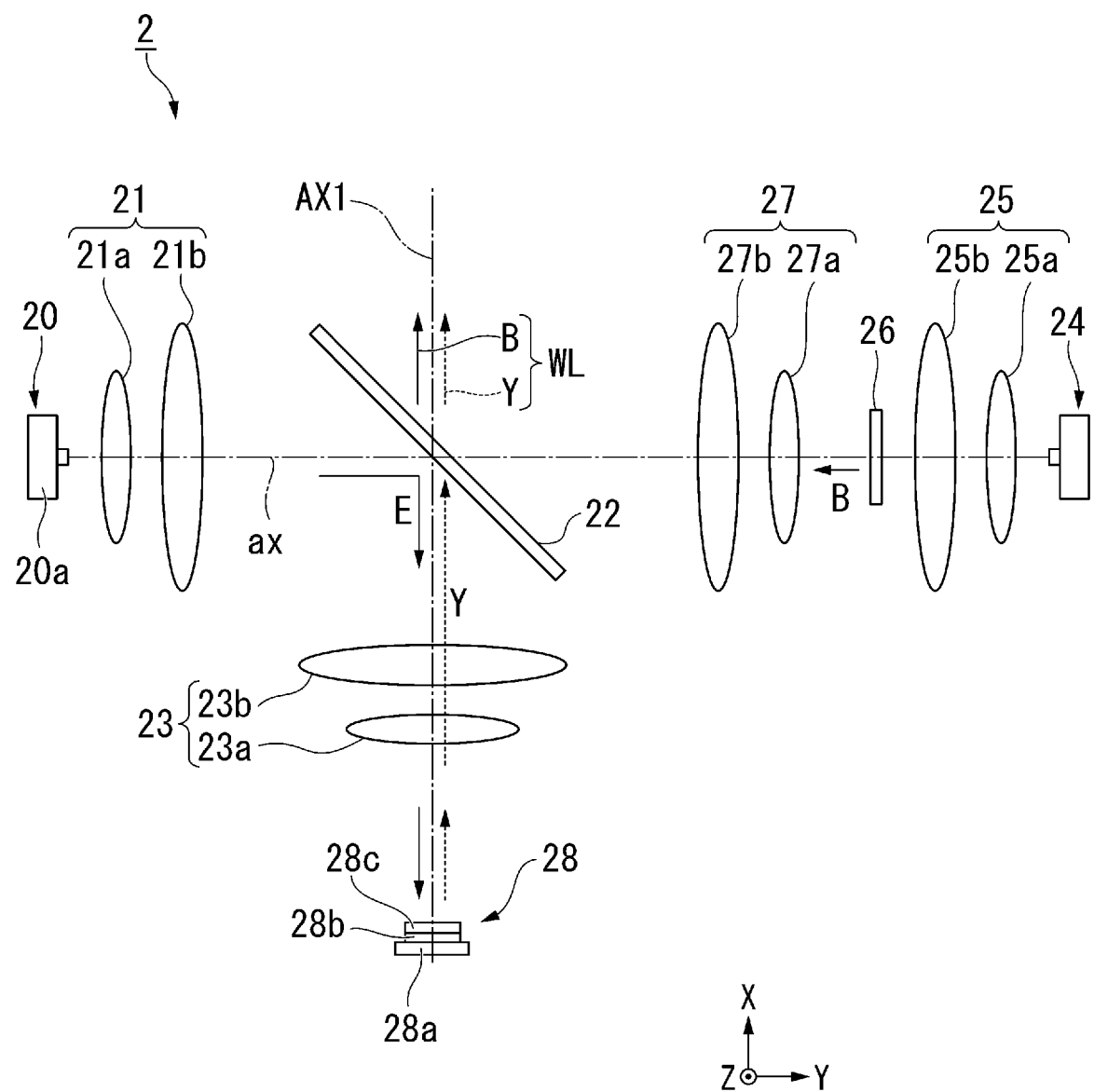
FIG. 2 is a schematic configuration diagram showing a light source device.

FIG. 2 is a schematic configuration diagram showing the light source device 2 in the present embodiment.

As shown in FIG. 2, the light source device 2 is provided with a first light source 20, a collimating optical system 21, a dichroic mirror 22, a collimating light collection optical system 23, a wavelength conversion element 28, a second light source 24, a light collection optical system 25, a diffuser plate 26, and a collimating optical system 27.

The first light source 20 is formed of a semiconductor laser 20a for emitting excitation light E having a blue color consisting of a laser beam. A peak in light emission intensity of the excitation light E is at, for example, 445 nm. It should be noted that as the semiconductor laser 20a, it is also possible to use a semiconductor laser for emitting blue light having a wavelength other than 445 nm such as 455 nm or 460 nm. An optical axis ax of the first light source 20 is an axis along the Y axis, and is perpendicular to the illumination light axis AX1 of the light source device 2 along the X axis. It should be noted that the first light source 20 can be configured by arranging a plurality of semiconductor lasers 20a in an array in a single plane perpendicular to the optical axis ax.

The collimating optical system 21 has lenses 21a, 21b. The collimating optical system 21 substantially collimates the light emitted from the first light source 20. The lenses 21a, 21b are each formed of a convex lens.

The dichroic mirror 22 is disposed in a light path from the collimating optical system 21 to the collimating light collection optical system 23 in a posture of crossing each of the optical axis ax of the first light source 20 and the illumination light axis AX1 at an angle of 45°. The dichroic mirror 22 reflects a blue light component, and transmits a red light component and a green light component. Therefore, the dichroic mirror 22 reflects the excitation light E and blue light B described later, and transmits fluorescence Y having a yellow color.

The collimating light collection optical system 23 makes the excitation light E having been transmitted through the dichroic mirror 22 converge to enter the wavelength conversion element 28, and at the same time, substantially collimates the fluorescence Y emitted from the wavelength conversion element 28. The collimating light collection optical system 23 has lenses 23a, 23b. The lenses 23a, 23b are each formed of a convex lens.

The wavelength conversion element 28 has a substrate 28a, a reflecting layer 28b, and a phosphor 28c as a wavelength conversion layer disposed at the light incident side of the reflecting layer 28b. The phosphor 28c performs a wavelength conversion on the excitation light E to thereby generate and then emit the fluorescence Y having the wavelength band of, for example, 500 through 700 nm. The reflecting layer 28b reflects a component proceeding toward the substrate 28a out of the fluorescence Y generated by the phosphor 28c. It should be noted that it is possible to dispose a heatsink not shown on a surface at an opposite side to a surface for supporting the phosphor 28c of the substrate 28a.

The second light source 24 is formed of a semiconductor laser having a wavelength band the same as the wavelength band of the first light source 20. It is possible for the second light source 24 to be formed of a single semiconductor laser, or to be formed of a plurality of semiconductor lasers. Further, it is also possible for the second light source 24 to be formed of a semiconductor laser different in wavelength band from the semiconductor laser of the first light source 20.

The light collection optical system 25 has lenses 25a, 25b. The blue light B emitted from the second light source 24 is converged by the light collection optical system 25 on a diffusion surface or in the vicinity of the diffusion surface of the diffuser plate 26. The lenses 25a, 25b are each formed of a convex lens.

The diffuser plate 26 diffuses the blue light B emitted from the second light source 24 to thereby generate the blue light B having a light distribution similar to the light distribution of the fluorescence Y having been emitted from the wavelength conversion element 28. As the diffuser plate 26, there can be used, for example, obscured glass made of optical glass.

The collimating optical system 27 has lenses 27a, 27b. The collimating optical system 27 substantially collimates the light emitted from the diffuser plate 46. The lenses 27a, 27b are each formed of a convex lens.

The blue light B having been emitted from the second light source 24 is reflected by the dichroic mirror 22, and is then combined with the fluorescence Y having been emitted from the wavelength conversion element 28 and then transmitted through the dichroic mirror 22 to thereby generate the illumination light WL having the white color.

In the projector 1 according to the present embodiment, the image forming unit 4 and the homogenous illumination unit 5 generate heat. The projector 1 according to the present embodiment is provided with a cooling mechanism for efficiently cooling the heat generated in the image forming unit 4 and the homogenous illumination unit 5.

Figure 3:
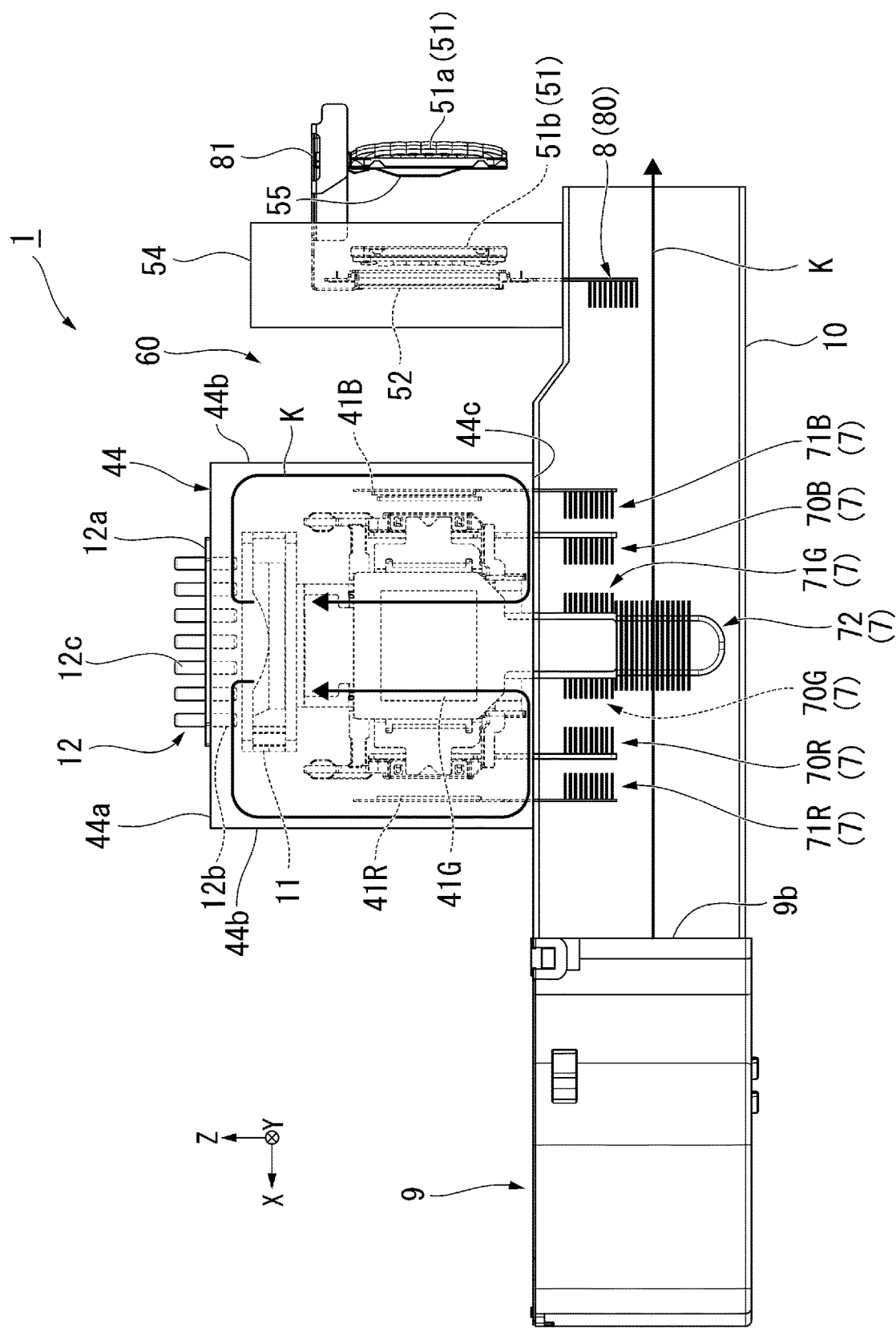
FIG. 3 is a side view of a cooling mechanism viewed from a −Y side.
Figure 4:
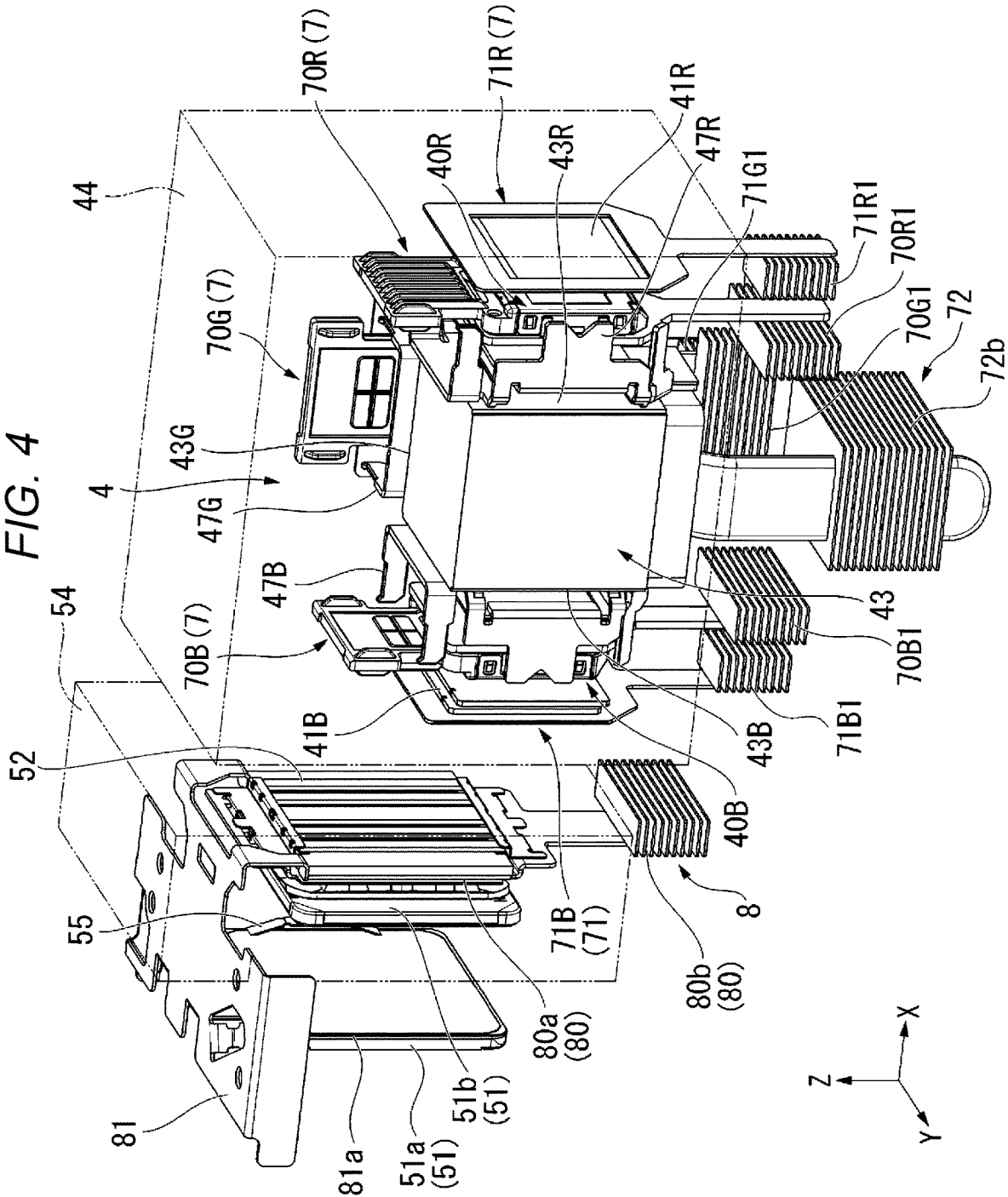
FIG. 4 is a perspective view of the cooling mechanism.

FIG. 3 and FIG. 4 are each a diagram showing a schematic configuration of the cooling mechanism 60 of the projector 1. FIG. 3 is a side view of the cooling mechanism 60 viewed from the −Y side. FIG. 4 is a perspective view of the cooling mechanism 60. In FIG. 3 and FIG. 4, an illustration of the superimposing lens 53 and the field lenses 45B, 45G, and 45R is omitted in order to make the drawings eye-friendly. In FIG. 4, an illustration of a first duct 10 is omitted.

As shown in FIG. 3, the cooling mechanism 60 has a first housing 44, a second housing 54, a first heat-transfer section 7, a second heat-transfer section 8, a first fan 9, a second fan 11, the first duct 10, and a first heat exchanger 12. In other words, the projector 1 according to the present embodiment is further provided with the first housing 44, the second housing 54, the first heat-transfer section 7, the second heat-transfer section 8, the first fan 9, the first duct 10, the second fan 11, and the first heat exchanger 12.

As shown in FIG. 1, the first housing 44 houses constituent members of the image forming unit 4, namely the plurality of liquid crystal panels 40, the plurality of incident side polarization plates 41, the plurality of exit side polarization plates 42, and the light combining element 43 in a sealed state. It should be noted that in the present embodiment, the field lenses 45B, 45G, and 45R are arranged outside the first housing 44, but can be arranged inside the first housing 44 as needed.

The second housing 54 houses the second lens array 51b as a part of the homogenous illumination unit 5, and the polarization conversion element 52 in a sealed state. The second lens array 51b corresponds to one lens array.

The first heat-transfer section 7 receives heat from at least one of the liquid crystal panels 40B, 40G, and 40R, the incident side polarization plates 41B, 41G, and 41R, and the exit side polarization plates 42B, 42G, and 42R housed in the first housing 44, and then conducts the heat to an outside of the first housing 44.

The second heat-transfer section 8 receives heat from at least one of the second lens array 51b of the homogenization optical element 51, and the polarization conversion element 52 housed in the second housing 54, and then conducts the heat to an outside of the second housing 54.

The first fan 9 suctions outside air via an inlet provided to an exterior chassis of the projector 1 not shown, and then feeds an air current K toward the first heat-transfer section 7 and the second heat-transfer section 8. As the first fan 9, there can be used, for example, a centrifugal fan or a sirocco fan, but the type of the fan is not limited thereto.

The first duct 10 extends from the first fan 9, and the first heat-transfer section 7 and the second heat-transfer section 8 are disposed in the first duct 10. The first duct 10 is a cylindrical member extending from a discharge port 9b as an ejection port of the first fan 9.

Through the first duct 10, there flows the air current K from the first fan 9. In the first duct 10, there are disposed a part of the first heat-transfer section 7 projecting to the outside from the first housing 44, and a part of the second heat-transfer section 8 projecting to the outside from the second housing 54. Thus, it is arranged that the first heat-transfer section 7 and the second heat-transfer section 8 disposed in the first duct 10 performs the heat exchange with the air current K from the first fan 9 to thereby release the heat.

In the present embodiment, the first heat-transfer section 7 includes a first heat-transfer member 70B, a second heat-transfer member 70G, a third heat-transfer member 70R, a fourth heat-transfer member 71B, a fifth heat-transfer member 71G, a sixth heat-transfer member 71R, and a single polarization plate-heat-transfer member 72.

As shown in FIG. 3 and FIG. 4, the first heat-transfer member 70B as a panel-heat-transfer member is disposed at the light exit side of the blue-liquid crystal panel 40B. The first heat-transfer member 70B extends from the blue-liquid crystal panel 40B to the inside of the first duct 10, and conducts the heat from the blue-liquid crystal panel 40B. The first heat-transfer member 70B has a first heat radiator 70B1 disposed in the first duct 10. The first heat radiator 70B1 is formed of a heatsink including a plurality of fins. The first heat radiator 70B1 exchanges the heat with the air current K flowing through the first duct 10 to thereby release the heat.

The second heat-transfer member 70G as a panel-heat-transfer member is disposed at the light exit side of the green-liquid crystal panel 40G. The second heat-transfer member 70G extends from the green-liquid crystal panel 40G to the inside of the first duct 10, and conducts the heat from the green-liquid crystal panel 40G. The second heat-transfer member 70G has a second heat radiator 70G1 disposed in the first duct 10. The second heat radiator 70G1 is formed of a heatsink including a plurality of fins. The second heat radiator 70G1 exchanges the heat with the air current K flowing through the first duct 10 to thereby release the heat.

The third heat-transfer member 70R as a panel-heat-transfer member is disposed at the light exit side of the red-liquid crystal panel 40R. The third heat-transfer member 70R extends from the red-liquid crystal panel 40R to the inside of the first duct 10, and conducts the heat from the red-liquid crystal panel 40R. The third heat-transfer member 70R has a third heat radiator 70R1 disposed in the first duct 10. The third heat radiator 70R1 is formed of a heatsink including a plurality of fins. The third heat radiator 70R1 exchanges the heat with the air current K flowing through the first duct 10 to thereby release the heat.

The fourth heat-transfer member 71B as a polarization plate-heat-transfer member extends from the blue-incident side polarization plate 41B to the inside of the first duct 10, and conducts the heat from the blue-incident side polarization plate 41B. The fourth heat-transfer member 71B has a fourth heat radiator 71B1 disposed in the first duct 10. The fourth heat radiator 71B1 is formed of a heatsink including a plurality of fins. The fourth heat radiator 71B1 exchanges the heat with the air current K flowing through the first duct 10 to thereby release the heat.

The fourth heat-transfer member 71B is fixed to, for example, the first housing 44 via an attachment member not shown to thereby arrange the blue-incident side polarization plate 41B at a predetermined position with respect to the blue-liquid crystal panel 40B.

The fifth heat-transfer member 71G as a polarization plate-heat-transfer member extends from the green-incident side polarization plate 41G to the inside of the first duct 10, and conducts the heat from the green-incident side polarization plate 41G. The fifth heat-transfer member 71G has a fifth heat radiator 71G1 disposed in the first duct 10. The fifth heat radiator 71G1 exchanges the heat with the air current K flowing through the first duct 10 to thereby release the heat.

The fifth heat radiator 71G1 is formed of a heatsink including a plurality of fins. The fifth heat-transfer member 71G is fixed to, for example, the first housing 44 via an attachment member not shown to thereby arrange the green-incident side polarization plate 41G at a predetermined position with respect to the green-liquid crystal panel 40G.

The sixth heat-transfer member 71R as a polarization plate-heat-transfer member extends from the red-incident side polarization plate 41R to the inside of the first duct 10, and conducts the heat from the red-incident side polarization plate 41R. The sixth heat-transfer member 71R has a sixth heat radiator 71R1 disposed in the first duct 10. The sixth heat radiator 71R1 is formed of a heatsink including a plurality of fins. The sixth heat radiator 71R1 exchanges the heat with the air current K flowing through the first duct 10 to thereby release the heat.

The sixth heat-transfer member 71R is fixed to, for example, the first housing 44 via an attachment member not shown to thereby arrange the red-incident side polarization plate 41R at a predetermined position with respect to the red-liquid crystal panel 40R.

The first heat-transfer member 70B, the second heat-transfer member 70G, and the third heat-transfer member 70R are not particularly limited as long as these heat-transfer members are members capable of conducting the heat received from the respective panels. The fourth heat-transfer member 71B, the fifth heat-transfer member 71G, and the sixth heat-transfer member 71R are not particularly limited as long as these heat-transfer members are members capable of conducting the heat received from the respective polarization plates.

In the present embodiment, as each of the heat-transfer members 70B, 70G, 70R, 71B, 71G, and 71R, there can be used, for example, a heat pipe using evaporation and condensation of a cooling medium or a vapor chamber in addition to graphite or copper.

Figure 5:
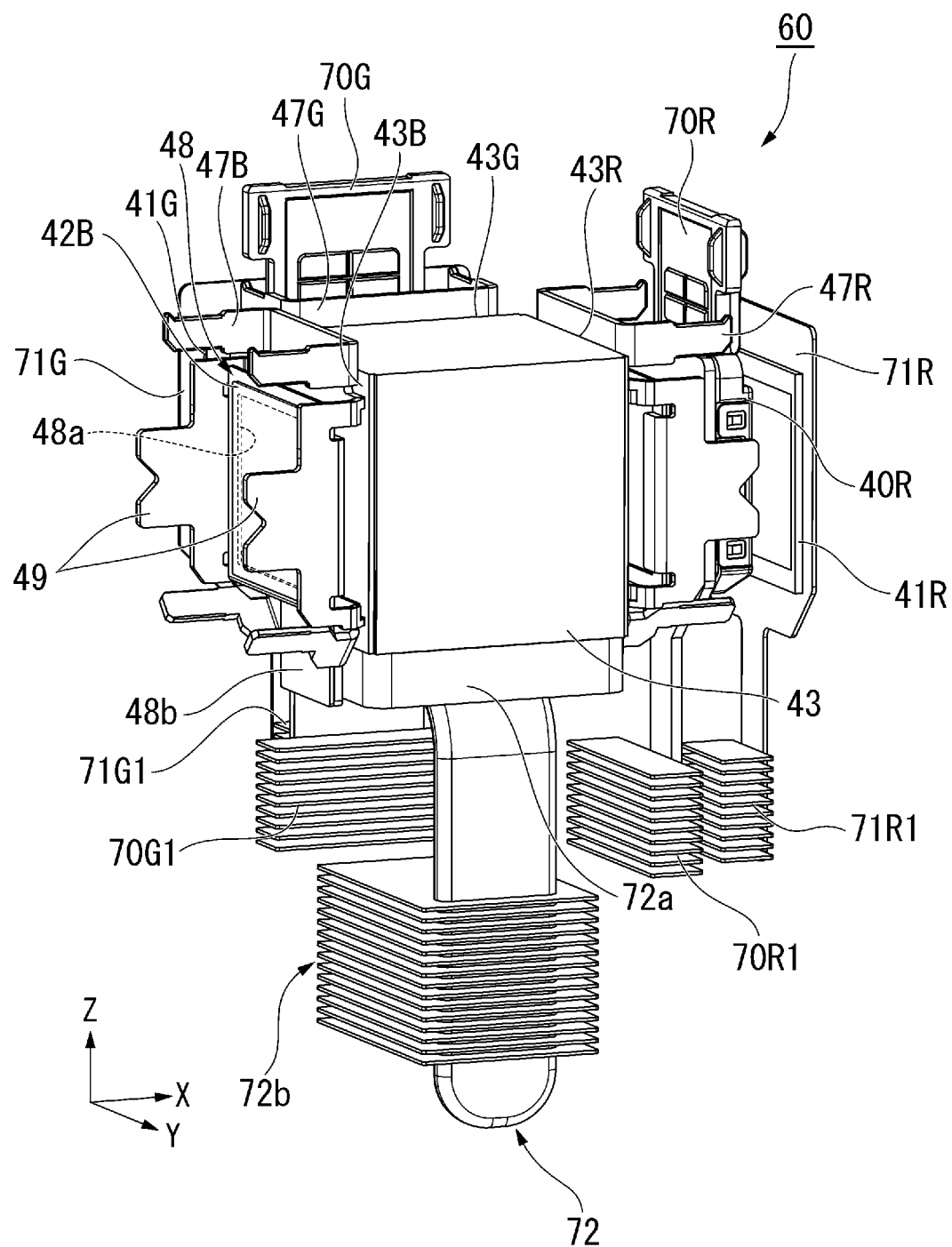
FIG. 5 is a perspective view showing a configuration of a principal part of the cooling mechanism.

FIG. 5 is a perspective view showing a configuration of a principal part of the cooling mechanism 60. In FIG. 5, in order to make the drawing eye-friendly, an illustration of the blue-incident side polarization plate 41B and the blue-liquid crystal panel 40B is omitted.

As shown in FIG. 5, the blue-exit side polarization plate 42B is held by a first panel attachment member 47B. The first panel attachment member 47B is provided with a support plate 48 for supporting the blue-exit side polarization plate 42B, and a pair of locking parts 49 capable of directly or indirectly locking the blue-liquid crystal panel 40B. The first heat-transfer member 70B and the blue-liquid crystal panel 40B are attached to a plane of incidence of light 43B of the light combining element 43 via the first panel attachment member 47B.

More specifically, the blue-liquid crystal panel 40B has an opposed substrate located at an incident side across a liquid crystal material, and a TFT element substrate located at an exit side. Further, the blue-liquid crystal panel 40B has an incident side dust-proof substrate disposed at a light incident side of the opposed substrate, and an exit side dust-proof substrate disposed at a light exit side of the TFT element substrate. These constituent members of the blue-liquid crystal panel 40B are arranged in a housing case, and are hold by a holding member fixed to the housing case so that the constituent members are not separated.

The housing case of the blue-liquid crystal panel 40B is provided with the first heat-transfer member 70B shown in FIG. 4 disposed on a surface at the exit side of the housing case. Thus, the heat of the opposed substrate, the TFT element substrate, the incident side dust-proof substrate, and the exit side dust-proof substrate is transferred to the first heat-transfer member 70B via the housing case. It is preferable for the first heat-transfer member 70B to be made of a material which is the same in thermal conductivity as the housing case, or which is high in thermal conductivity.

Further, it is assumed that the first heat-transfer member 70B is arranged at the light exit side of the blue-liquid crystal panel 40B, but since it is sufficient for the heat to be transferred from the housing case, the arrangement of the first heat-transfer member 70B at the light exit side is not a limitation.

It should be noted that the same applies to the relationship between the green-liquid crystal panel 40G and the second heat-transfer member 70G, and the relationship between the red-liquid crystal panel 40R and the third heat-transfer member 70R.

Further, the fourth heat-transfer member 71B is not limited to a configuration of being fixed to the first housing 44 via an attachment member not shown. It is possible to fix the fourth heat-transfer member 71B to the support plate 48. The same applies to the fifth heat-transfer member 71G and the sixth heat-transfer member 71R.

As shown in FIG. 5, the support plate 48 is provided with an opening 48a for transmitting light emitted from the blue-exit side polarization plate 42B, and a coupler 48b thermally coupled to the polarization plate-heat-transfer member 72 extending toward the −Z side to the first duct 10. It should be noted that the sentence that something is thermally coupled to the polarization plate-heat-transfer member 72 means a state in which that thing is coupled to the polarization plate-heat-transfer member 72 in a heat-transferable manner.

The polarization plate-heat-transfer member 72 includes a base 72a thermally coupled to the coupler 48b of the first panel attachment member 47B as the support plate 48, and a heat radiator 72b which extends toward the −Z side from the base 72a and is arranged in the first duct 10. The heat of the blue-exit side polarization plate 42B is transferred from the base 72a to the heat radiator 72b, and is then released. The heat radiator 72b includes a heatsink including a plurality of fins. As shown in FIG. 3, the heat radiator 72b exchanges the heat with the air current K flowing through the first duct 10 to thereby release the heat.

Since the heat radiator 72b of the polarization plate-heat-transfer member 72 is sufficiently large in size than the heat radiators of the rest of the heat-transfer members, namely the heat-transfer members 70B, 70G, 70R, 71B, 71G, and 71R, the heat radiation property of the polarization plate-heat-transfer member 72 is made high.

By disposing the heat radiator 72b of the polarization plate-heat-transfer member 72 below an area of the light combining element 43 so as to overlap the area of the light combining element 43, it is possible to prevent the first duct 10 from growing in size. Further, it is preferable for the heat radiator 72b of the polarization plate-heat-transfer member 72 to be different in height direction from the first heat radiator 70B1 of the first heat-transfer member 70B, the second heat radiator 70G1 of the second heat-transfer member 70G, and the third heat radiator 70R1 of the third heat-transfer member 70R. In other words, it is possible for the heat radiator 72b of the polarization plate-heat-transfer member 72 to be disposed below the first heat radiator 70B1 of the first heat-transfer member 70B, the second heat radiator 70G1 of the second heat-transfer member 70G, and the third heat radiator 70R1 of the third heat-transfer member 70R to thereby prevent the interference even when increasing the size.

It should be noted that the polarization plate-heat-transfer member 72 is not particularly limited as long as the polarization plate-heat-transfer member 72 is a member capable of conducting the heat received from each of the polarization plates. In the present embodiment, as the polarization plate-heat-transfer member 72, there can be used, for example, a heat pipe using evaporation and condensation of a cooling medium or a vapor chamber in addition to graphite or copper.

As shown in FIG. 4 and FIG. 5, the green-exit side polarization plate 42G is held by a plane of incidence of light 43G of the light combining element 43 via a second panel attachment member 47G. The red-exit side polarization plate 42R is held by a plane of incidence of light 43R of the light combining element 43 via a third panel attachment member 47R. It should be noted that the second heat-transfer member 70G and the green-liquid crystal panel 40G are attached to the plane of incidence of light 43G of the light combining element 43 via the second panel attachment member 47G. The third heat-transfer member 70R and the red-liquid crystal panel 40R are attached to the plane of incidence of light 43R of the light combining element 43 via the third panel attachment member 47R.

The second panel attachment member 47G and the third panel attachment member 47R are each the same in configuration as the first panel attachment member 47B. In other words, the second panel attachment member 47G and the third panel attachment member 47R are thermally coupled to the polarization plate-heat-transfer member 72.

Thus, the heat of the green-exit side polarization plate 42G is transferred to the polarization plate-heat-transfer member 72 via the second panel attachment member 47G, and the heat of the red-exit side polarization plate 42R is transferred to the polarization plate-heat-transfer member 72 via the third panel attachment member 47R.

In the case of the present embodiment, the heat of the exit side polarization plates 42B, 42G, and 42R is transferred to the single polarization plate-heat-transfer member 72 to thereby be released inside the first duct 10. According to this configuration, it is possible to obtain a high cooling effect while simplifying the configuration compared to when extending heat-transfer members respectively from the exit side polarization plates 41B, 42G, and 42R to the inside of the first duct 10.

As shown in FIG. 3, in the cooling mechanism 60 in the present embodiment, the second fan 11 is housed in the first housing 44. The second fan 11 is disposed above the +Z side of the image forming unit 4. As the second fan 11, there is used, for example, an axial fan, but the type of the fan is not limited thereto.

The second fan 11 generates the air current K proceeding from the −Z side toward the +Z side, namely from the lower side toward the upper side, in the first housing 44 to thereby cool the members of the image forming unit 4.

In the cooling mechanism 60 in the present embodiment, a part of the first heat exchanger 12 is disposed inside the first housing 44, and the rest of the first heat exchanger 12 is disposed outside the first housing 44. The first heat exchanger 12 performs the heat exchange between an atmosphere inside the first housing 44 and an atmosphere outside the first housing 44 to thereby lower the temperature in the first housing 44.

The first heat exchanger 12 includes a base 12a, a heat absorber 12b, and a heat radiator 12c. The base 12a fixes the first heat exchanger 12 to an upper plate 44a of the first housing 44. The heat absorber 12b is constituted by a plurality of protrusions provided to a surface at the −Z side opposed to the first housing 44 out of the base 12a. The heat absorber 12b is arranged inside the first housing 44. The heat absorber 12b absorbs the heat from an internal space of the first housing 44. The heat radiator 12c is constituted by a plurality of radiator fins provided to a surface at the +Z side at an opposite side to the first housing 44 out of the base 12a. The base 12a and the heat radiator 12c are arranged outside the first housing 44.

The air current K caused by the second fan 11 flows toward a lateral side along the heat absorber 12b of the first heat exchanger 12 protruding inward from the upper plate 44a of the first housing 44. On this occasion, the heat of the air current K is absorbed by the heat absorber 12b of the first heat exchanger 12, and thus, the air current K is cooled.

The air current K cooled by the first heat exchanger 12 flows along the inner surface of a side plate 44b of the first housing 44 from the +Z side toward the −Z side, namely from the upper side toward the lower side, and then reaches a lower plate 44c of the first housing 44. The air current K having reached the lower plate 44c of the first housing 44 is suctioned by the second fan 11 to thereby flow from the −Z side toward the +Z side, namely from the lower side toward the upper side, to cool the members of the image forming unit 4. In other words, the air current K caused by the second fan 11 is circulated inside the first housing 44.

According to the present embodiment, the air current K which has cooled the members of the image forming unit 4, and has thus been heated passes through the first heat exchanger 12 to thereby be cooled, and is then suctioned again by the second fan 11 to thereby circulate inside the first housing 44. Therefore, it is possible for the second fan 11 to continuously supply the image forming unit 4 with the air current K relatively low in temperature.

As described above, it is possible for the projector 1 according to the present embodiment to efficiently cool the constituent members of the image forming unit 4 together with the first heat-transfer section 7 by circularly feeding the air current K relatively low in temperature to the image forming unit 4 housed in the first housing 44 in the sealed state with the cooling mechanism 60.

As shown in FIG. 3 and FIG. 4, the second heat-transfer section 8 in the present embodiment includes a single heat-transfer member 80. As shown in FIG. 4, the heat-transfer member 80 includes a heat receiver 80a attached at a light incident side of the polarization conversion element 52, and a heat radiator 80b extending from the heat receiver 80a to the inside of the first duct 10. In the heat receiver 80a, there is formed a plurality of openings which correspond to the light incident area of the polarization conversion element 52, and each extend to form a slit-like shape. The heat of the polarization conversion element 52 is transferred from the heat receiver 80a to the heat radiator 80b, and is then released. The heat radiator 80b is formed of a heatsink including a plurality of fins.

It should be noted that the heat-transfer member 80 is not particularly limited as long as the heat-transfer member 80 is a member capable of transferring the heat received from the polarization conversion element 52 to the inside of the first duct 10. In the present embodiment, as the heat-transfer member 80, there can be used, for example, a heat pipe using evaporation and condensation of a cooling medium or a vapor chamber in addition to graphite or copper.

In the present embodiment, the second heat-transfer section 8 as the heat-transfer member 80 and the polarization conversion element 52 are attached to the second housing 54 via a support member 81. The second lens array 51b housed in the second housing 54 together with the polarization conversion element 52 is fixed to the support member 81 or the second housing 54 via a fixation member not shown.

As shown in FIG. 4, the support member 81 extends from the polarization conversion element 52 toward the light incident side at the −X side of the homogenous illumination unit 5, and is arranged up to an outside of the second housing 54. The support member 81 includes a fixation section 81a for fixing the first lens array 51a. The fixation section 81a of the support member 81 fixes, for example, an end surface at the light exit side at the +X side of the first lens array 51a via a spring member 55.

Here, out of the constituent members of the homogenous illumination unit 5, the polarization conversion element 52 becomes the largest in amount of heat generation. This is because a wave plate constituting the polarization conversion element 52 absorbs the illumination light WL to generate heat.

In the projector 1 according to the present embodiment, the heat of the polarization conversion element 52 which generates the largest amount of heat in the second housing 54 can be released in the first duct 10 with the second heat-transfer section 8. Thus, by efficiently cooling the polarization conversion element 52, the rise in temperature of the sealed space in the second housing 54 is suppressed, and therefore, it is possible to suppress the damage by the heat to the second lens array 51b housed inside together with the polarization conversion element 52.

As described hereinabove, in the projector 1 according to the present embodiment, the image forming unit 4 as a cooling target is housed in the first housing 44 in the sealed state, and the polarization conversion element 52 and the second lens array 51b as a part of the homogenization optical element 51 are housed in the sealed state in the second housing 54. It should be noted that the image forming unit 4 includes the liquid crystal panels 40B, 40G, and 40R, the incident side polarization plates 41B, 41G, and 41R, and the exit side polarization plates 42B, 42G, and 42R.

In the case of the present embodiment, by feeding the air current K from the first fan 9 to each of the heat-transfer sections 7, 8 drawn from the housings 44, 45 to the inside of the first duct 10, it is possible to cool the heat-transfer sections 7, 8. Therefore, since it is possible to cool the two heat-transfer sections 7, 8 with a single fan, it is possible to reduce the device configuration in size.

Further, since it is possible to suppress the rise in temperature of the sealed space by actively releasing the heat to the outside from the sealed space in each of the housings 44, 45 with the heat-transfer sections 7, 8, there is no need to enlarge the sealed space. Therefore, in the case of the present embodiment, since it is possible to make the internal space of each of the housings 44, 45 as small as possible, it is possible to achieve the reduction in size of the device configuration as a result.

It should be noted that depending on the use environment of the projector 1, there exists smoke around the projector 1 in some cases. As an environment in which the smoke exists around the projector 1, there can be cited, for example, smoke for rendering in an event and smoke of a cigarette.

In contrast, in the case of the projector 1 according to the present embodiment, when smoke exists in a peripheral environment, since the image forming unit 4, the polarization conversion element 52, and the second lens array 51b are housed in the sealed space, even when dust and smoke enter the chassis of the projector 1, the dust and the smoke are prevented from adhering. Therefore, it is possible to prevent a deterioration of a display quality due to the adherence of the dust or the smoke to the image forming unit 4, the polarization conversion element 52, and the second lens array 51b.

Since the first heat-transfer section 7 in the present embodiment includes the single polarization plate-heat-transfer member 72 extending from each of the exit side polarization plates 42B, 42G, and 42R to the inside of the first duct 10, it is possible to cool the exit side polarization plates 42B, 42G, and 42R with the single heat-transfer member. Thus, it is possible to obtain high cooling efficiency while commonalizing a part of the first heat-transfer section 7 to thereby prevent the complication of the configuration.

In the case of the present embodiment, there are further provided the second fan 11 housed in the first housing 44, and the first heat exchanger 12 for cooling the air current K fed into the first housing 44 by the second fan 11. Therefore, since the second fan 11 is capable of continuously supplying the air current K relatively low in temperature to the image forming unit 4 housed in the first housing 44, it is possible to increase the cooling efficiency of the image forming unit 4.

Second Embodiment

Then, a projector according to a second embodiment will be described.

The projector according to the present embodiment is different in configuration of the cooling mechanism from the first embodiment. Constituents and members common to the first embodiment will be denoted by the same reference symbols, and the description of the details will be omitted.

Figure 6:
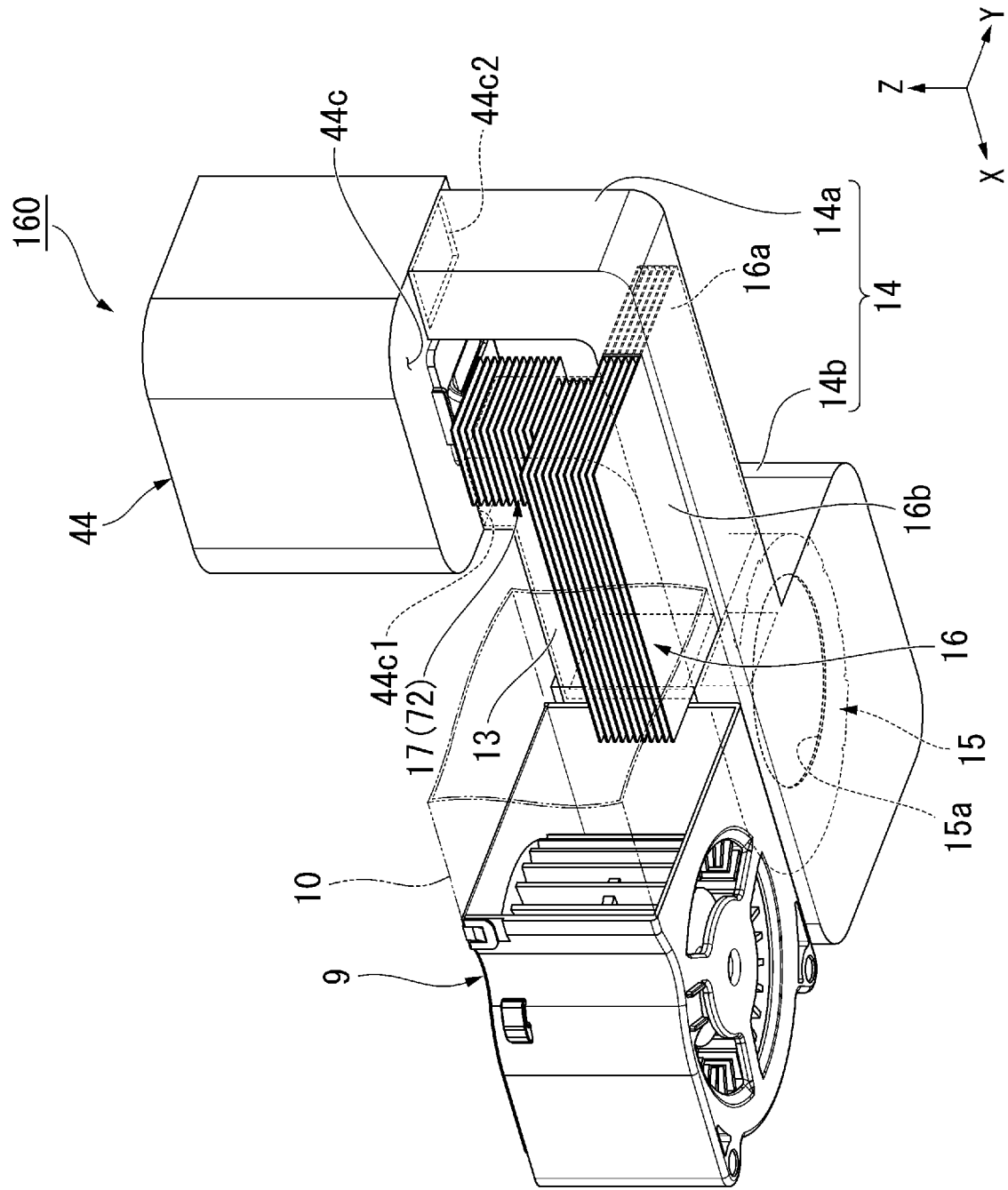
FIG. 6 is a perspective view showing a schematic configuration of a cooling mechanism according to a second embodiment.
Figure 7:
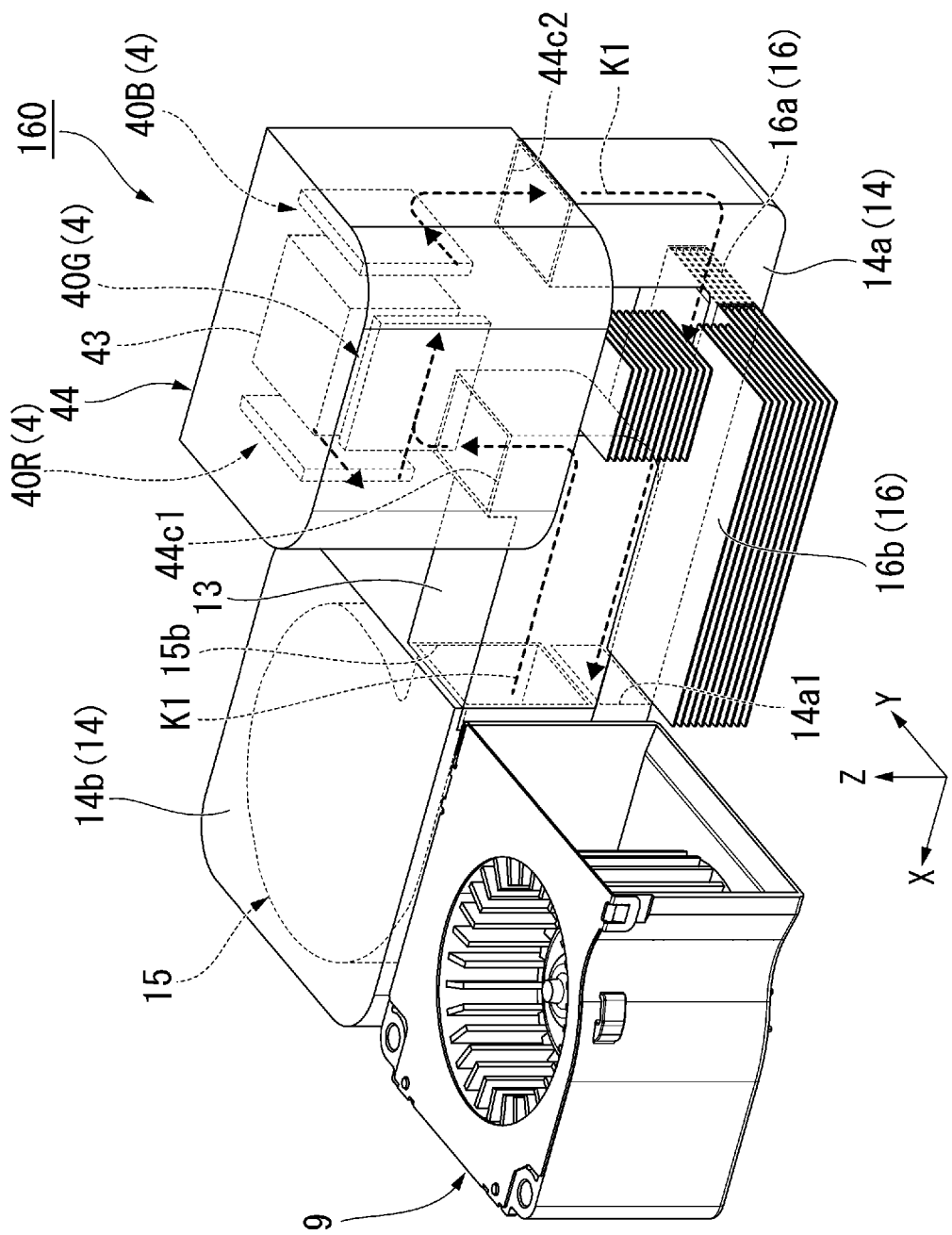
FIG. 7 is a diagram showing a flow of an air current in the cooling mechanism according to the second embodiment.

Hereinafter, the cooling mechanism in the present embodiment will mainly be described. FIG. 6 and FIG. 7 are each a diagram showing a schematic configuration of the cooling mechanism 160 in the present embodiment. FIG. 6 is a perspective view showing the schematic configuration of the cooling mechanism 160. FIG. 7 is a diagram showing a flow of an air current in the cooling mechanism 160. It should be noted that in the cooling mechanism 160 in the present embodiment, since the second heat-transfer section 8 is substantially the same in configuration as that of the cooling mechanism 60 in the first embodiment, the description and the illustration thereof will be omitted. Further, in order to make the drawings eye-friendly, there is shown only a part of the first duct 10.

As shown in FIG. 6 and FIG. 7, the cooling mechanism 160 has a first heat-transfer section 17, the first fan 9, the first duct 10, a second duct 13, a third duct 14, a third fan 15, and a second heat exchanger 16.

The first heat-transfer section 17 in the present embodiment has the polarization plate-heat-transfer member 72. The second duct 13 is coupled to the first housing 44. Specifically, the second duct 13 is coupled to an inflow port 44c1 formed at the +X side as one side of the lower plate 44c of the first housing 44.

The third fan 15 discharges the air suctioned through an inlet 15a from an outlet 15b as an ejection port. The third fan 15 feeds an air current K1 into the first housing 44 via the second duct 13 coupled to the outlet 15b. As the third fan 15, there can be used, for example, a centrifugal fan or a sirocco fan, but the type of the fan is not limited thereto.

The third duct 14 feeds the air current K1 discharged from the inside of the first housing 44 to the inlet 15a of the third fan 15. The third duct 14 is coupled to an outflow port 44c2 formed at the −X side as the other side of the lower plate 44c of the first housing 44. The third duct 14 includes a flow channel 14a and a fan housing 14b. The flow channel 14a is a region shaped like a cylinder extending from the outflow port 44c2 of the first housing 44 toward the third fan 15. The fan housing 14b is coupled to a tip 14a1 of the flow channel 14a, and houses the third fan 15 inside in a sealed state. The fan housing 14b and the first housing 44 are communicated with each other via the flow channel 14a.

The second heat exchanger 16 has a heat absorber 16a for absorbing the heat from the air current K1 flowing through the third duct 14, and a heat radiator 16b disposed in the first duct 10. In other words, in the second heat exchanger 16, the heat absorber 16a is disposed in the third duct 14, and the heat radiator 16b is disposed in the first duct 10. The heat absorber 16a and the heat radiator 16b are each formed of, for example, a heatsink structure including a plurality of fins. The second heat exchanger 16 exchanges heat between the air current K1 flowing through the third duct 14 and the air current K flowing through the first duct 10 to thereby lower the temperature of the air current K1 flowing through the third duct 14.

In the cooling mechanism 160 in the present embodiment, when the third fan 15 rotates, the air current K1 from the third fan 15 is supplied to the inside of the first housing 44 via the second duct 13 as shown in FIG. 7. The air current K1 supplied from the inflow port 44c1 to the inside of the first housing 44 is fed to the red-liquid crystal panel 40R, the green-liquid crystal panel 40G, and the blue-liquid crystal panel 40B in sequence along the inside wall of the first housing 44, and cools the liquid crystal panels 40B, 40G, 40R. Then, the air current K flows from the outflow port 44c2 toward the third duct 14, and is then attracted by a suction force due to the third fan 15 to thereby flow into the inlet 15a of the third fan 15.

In the present embodiment, the air current K passes through the heat absorber 16a of the second heat exchanger 16 disposed in the flow channel 14a of the third duct 14 in a process of returning to the third fan 15 via the third duct 14. On this occasion, the heat of the air current K is absorbed by the heat absorber 16a of the second heat exchanger 16, and thus, the air current K is cooled.

The air current K cooled by the second heat exchanger 16 is suctioned again by the third fan 15, and flows through the first housing 44 via the second duct 13 to cool the liquid crystal panels 40B, 40G, and 40R. In other words, the air current K1 caused by the third fan 15 is circularly supplied to the inside of the first housing 44.

According to the cooling mechanism 160 in the present embodiment, since the air current K1 which cools the members of the image forming unit 4 to thereby be heated is cooled by the second heat exchanger 16, and is supplied to the inside of the first housing 44 via the second duct 13, it is possible to efficiently cool the liquid crystal panels 40B, 40G, and 40R, the incident side polarization plates 41B, 41G, and 41R, and the exit side polarization plates 42B, 42G, and 42R (see FIG. 1) as the constituent members of the image forming unit 4.

Further, in the cooling mechanism 160 in the present embodiment, since the third fan 15 is disposed outside the first housing 44, it is possible to reduce the size of the first housing 44.

Further, in the case of the present embodiment, since the first duct 10 is used as a measure for lowering the temperature of the air current K1 flowing through the third duct 14, another mechanism for cooling the air current K1 becomes unnecessary, and thus, it is possible to prevent the device configuration from growing in size.

Further, in the case of the present embodiment, since the third fan 15 is housed in the fan housing 14b of the third duct 14, it is possible to set the inside of the first housing 44 in the sealed state. Therefore, since the dust and the smoke are prevented from entering the first housing 44 due to the air current K1 fed from the third fan 15, it is possible to prevent the deterioration of the display quality due to the adherence of the dust and the smoke to the constituents of the image forming unit 4.

Third Embodiment

Then, a projector according to a third embodiment will be described.

The projector according to the present embodiment is different in configuration at the second housing side in the cooling mechanism from the first embodiment. Constituents and members common to the first embodiment will be denoted by the same reference symbols, and the description of the details will be omitted.

Figure 8A:
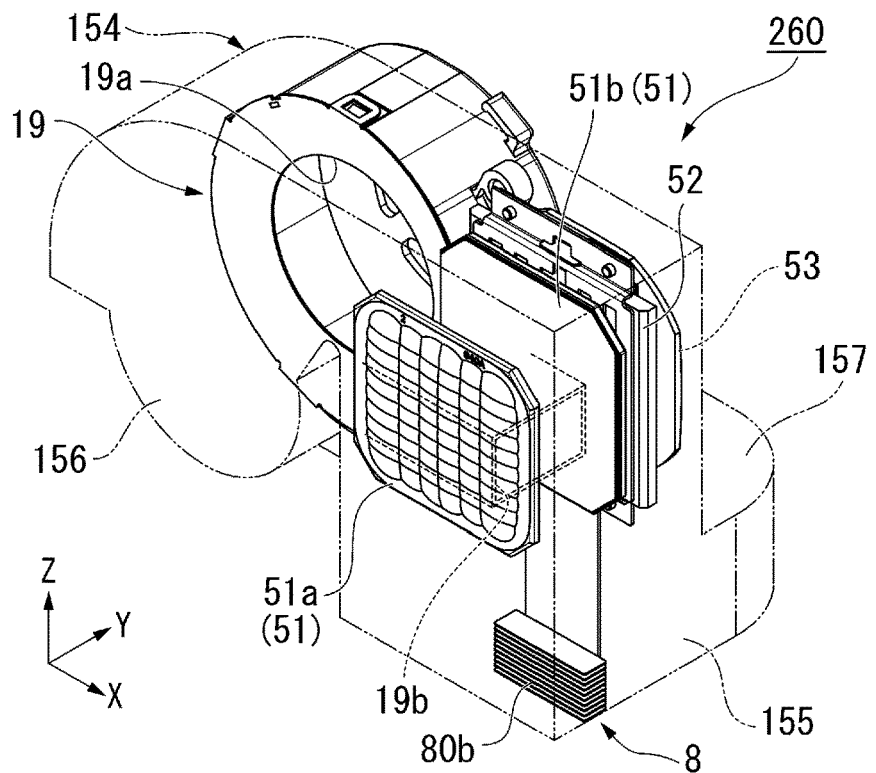
FIG. 8A is a perspective view showing a schematic configuration of a cooling mechanism according to a third embodiment.
Figure 8B:
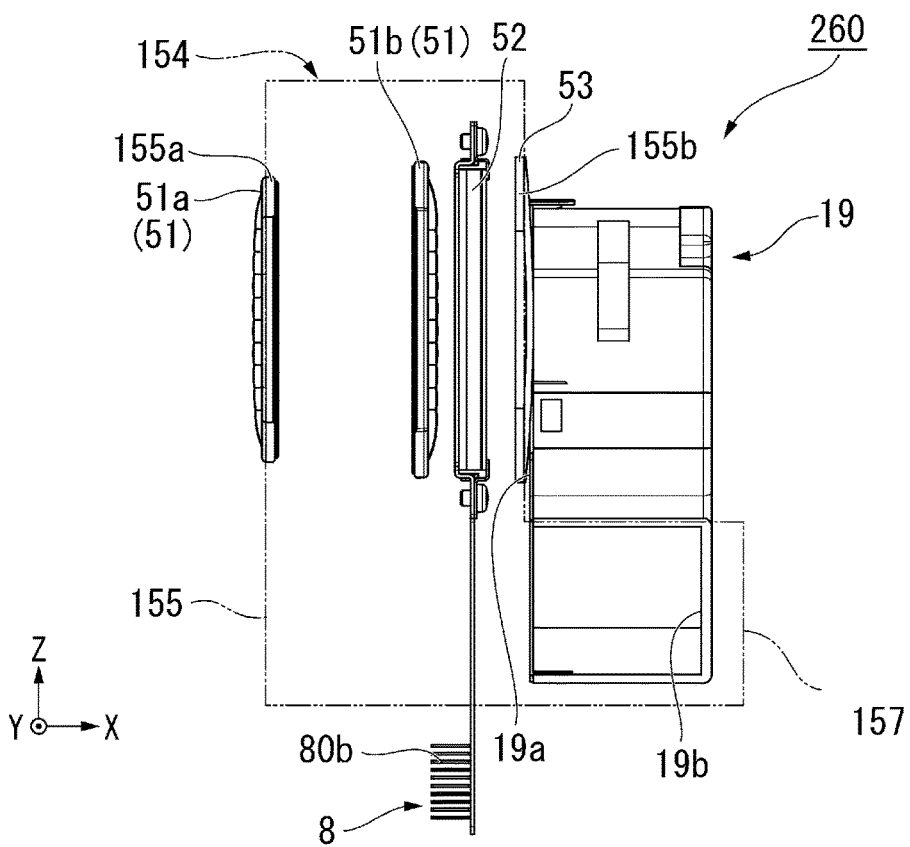
FIG. 8B is a side view showing the schematic configuration of the cooling mechanism according to the third embodiment.
Figure 9:
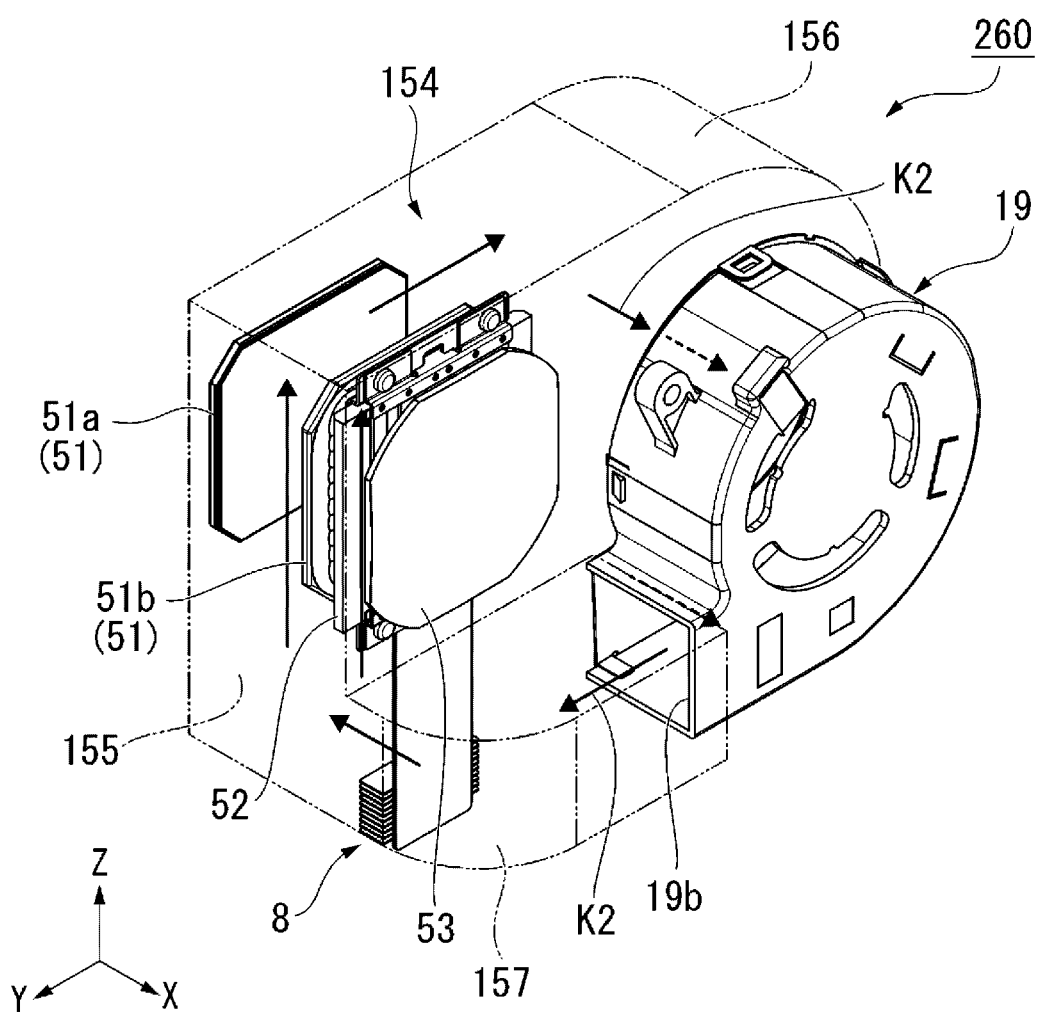
FIG. 9 is a diagram showing a flow of an air current in the cooling mechanism according to the third embodiment.

Hereinafter, the cooling mechanism in the present embodiment will mainly be described. FIG. 8A, FIG. 8B, and FIG. 9 are each a diagram showing a configuration of a principal part of the cooling mechanism 260 in the present embodiment. FIG. 8A is a perspective view showing a configuration of a principal part of the cooling mechanism 260, FIG. 8B is a side view showing a configuration of a principal part of the cooling mechanism 260, and FIG. 9 is a diagram showing a flow of an air current in the cooling mechanism 260. It should be noted that in the cooling mechanism 260 in the present embodiment, since the configuration at the first housing 44 side is substantially the same as that of the cooling mechanism 60 in the first embodiment, the description and the illustration thereof will be omitted.

As shown in FIG. 8A and FIG. 8B, the cooling mechanism 260 in the present embodiment is provided with a second housing 154 and a fourth fan 19. The second housing 154 houses the second lens array 51b and the polarization conversion element 52 wherein the second lens array 51b is located at the light exit side of a posterior stage in the pair of lens arrays 51a, 51b constituting the homogenization optical element 51, and the polarization conversion element 52 is located at the +X side of the posterior stage of the second lens array 51b. The second lens array 51b corresponds to a posterior lens array. In the present embodiment, the second heat-transfer section 8 conducts the heat of the polarization conversion element 52. The second heat-transfer section 8 and the polarization conversion element 52 are attached to the second housing 154 via a fixation member not shown.

The second housing 154 is provided with a main body 155, an inlet coupler 156 coupled to an inlet 19a of the fourth fan 19, and an outlet coupler 157 coupled to an outlet 19b as an ejection port of the fourth fan 19. The main body 155 includes a light incident part 155a and a light exit part 155b, and houses the second lens array 51b and the polarization conversion element 52. The heat radiator 80b of the second heat-transfer section 8 extends to an outside of the main body 155.

In the light incident part 155a of the second housing 154, there is disposed the first lens array 51a located at the light incident side of the anterior stage in the pair of lens arrays 51a, 51b. The second housing 154 corresponds to the main body 155, and the first lens array 51a corresponds to an anterior lens array. In the light exit part 155b of the second housing 154, there is disposed the superimposing lens 53. The first lens array 51a and the superimposing lens 53 are arranged so as to cover an opening or a light transmissive window provided to the second housing 154.

As shown in FIG. 9, the fourth fan 19 makes an air current K2 flow in the second housing 154. The fourth fan 19 discharges the air suctioned through the inlet 19a shown in FIG. 8B from the outlet 19b. The fourth fan 19 feeds the air current K2 into the second housing 154 via the outlet coupler 157 of the second housing 154 coupled to the outlet 19b. The air current K2 from the fourth fan 19 flows along at least a surface of the polarization conversion element 52, and is then fed to the inlet 19a of the fourth fan 19. As the fourth fan 19, there can be used, for example, a centrifugal fan or a sirocco fan, but the type of the fan is not limited thereto.

As shown in FIG. 8A and FIG. 8B, in the present embodiment, the air current K2 having flowed into the second housing 154 via the inlet coupler 156 flows between the pair of lens arrays 51a, 51b, between the second lens array 51b and the polarization conversion element 52, and between the polarization conversion element 52 and the superimposing lens 53 in the main body 155, and cools the lens arrays 51a, 51b, the polarization conversion element 52, and the superimposing lens 53. Then, the air current K2 flows to the inlet coupler 156, and is then attracted by a suction force due to the fourth fan 19 to thereby flow into the inlet 19a of the fourth fan 19.

According to the cooling mechanism 260 in the present embodiment, since the first lens array 51a and the superimposing lens 53 are arranged outside the second housing 154, it is possible to reduce the size of the second housing 154 compared to when housing the first lens array 51a and the superimposing lens 53 inside.

Further, according to the present embodiment, by cooling the polarization conversion element 52 using the second heat-transfer section 8, and at the same time, circularly supplying the air current K2 in the second housing 154, it is possible to efficiently cool the polarization conversion element 52 large in amount of heat generation.

Fourth Embodiment

Then, a projector according to a fourth embodiment will be described.

The projector according to the present embodiment is different from the first embodiment in the point that an image forming unit using light modulation panels different from the liquid crystal panels is provided. Constituents and members common to the first embodiment will be denoted by the same reference symbols, and the description of the details will be omitted.

Figure 10:
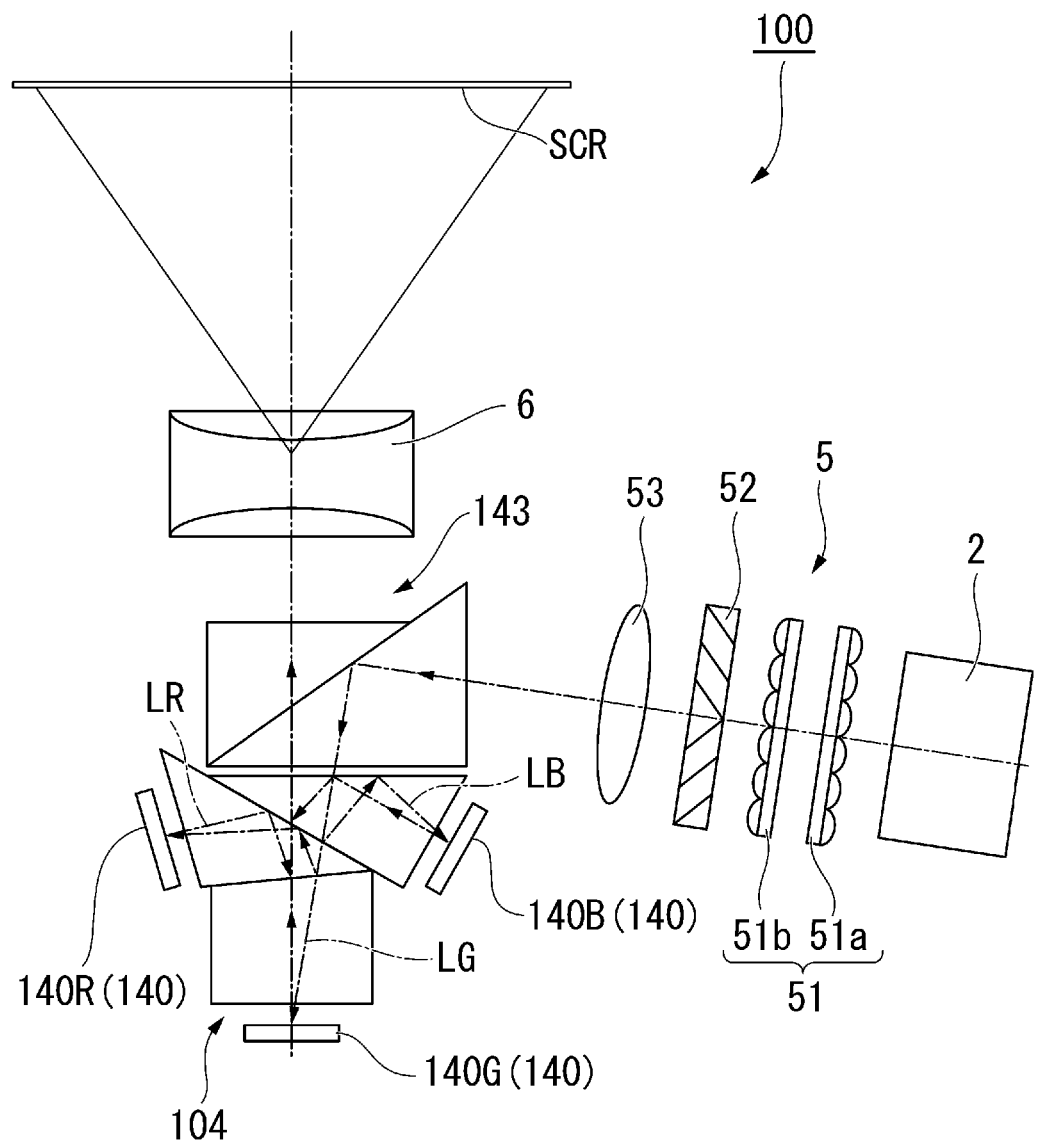
FIG. 10 is a diagram showing a schematic configuration of a projector according to a fourth embodiment.

FIG. 10 is a diagram showing a schematic configuration of the projector 100 according to the present embodiment.

As shown in FIG. 10, the projector 100 according to the present embodiment is provided with the light source device 2, an image forming unit 104, the homogenous illumination unit 5, and the projection optical system 6.

The image forming unit 104 according to the present embodiment is provided with a plurality of light modulation panels 140 and a light combining element 143. The plurality of light modulation panels 140 includes a blue-light modulation panel 140B, a green-light modulation panel 140G, and a red-light modulation panel 140R. The blue-light modulation panel 140B modulates the blue light beam LB in accordance with image information to form a blue image light beam. The green-light modulation panel 140G modulates the green light beam LG in accordance with the image information to form a green image light beam. The red-light modulation panel 140R modulates the red light beam LR in accordance with the image information to form a red image light beam. The blue-light modulation panel 140B, the green-light modulation panel 140G, and the red-light modulation panel 140R are hereinafter collectively referred to as light modulation panels 140B, 140G, and 140R, respectively.

As each of the light modulation panels 140B, 140G, and 140R, there is used, for example, a DMD (Digital Micromirror Device). The DMD is constituted by a plurality of micromirrors arranged in a matrix. The DMD is capable of switching the reflection direction of the incident light between a direction in which the incident light enters the projection optical device 6 and a direction in which the incident light fails to enter the projection optical device 6 in cooperation with the light combining element 143 by switching the tilt directions of the plurality of micromirrors.

The light combining element 143 is configured by a plurality of prism members combined with each other. The light combining element 143 separates the illumination light WL which has been emitted from the light source device 2 and has then passed through the homogenous illumination unit 5 into the red light beam LR, the green light beam LG, and the blue light beam LB, and makes the corresponding light beams enter the respective light modulation panels 140B, 140G, and 140R. Further, the light combining element 143 combines the light beams reflected by the respective light modulation panels 140B, 140G, and 140R in directions of entering the projection optical system 6 to generate the image light.

The image light combined by the light combining element 143 of the image forming unit 104 enters the projection optical system 6. The projection optical system 6 projects the image light combined by the light combining element 143 toward the screen SCR in an enlarged manner. Thus, the color image enlarged is displayed on the screen SCR.

In the projector 100 according to the present embodiment, the image forming unit 104 and the homogenous illumination unit 5 become a heat generation body for generating heat. The projector 100 according to the present embodiment is provided with a cooling mechanism for cooling the image forming unit 104 and the homogenous illumination unit 5.

Figure 11:
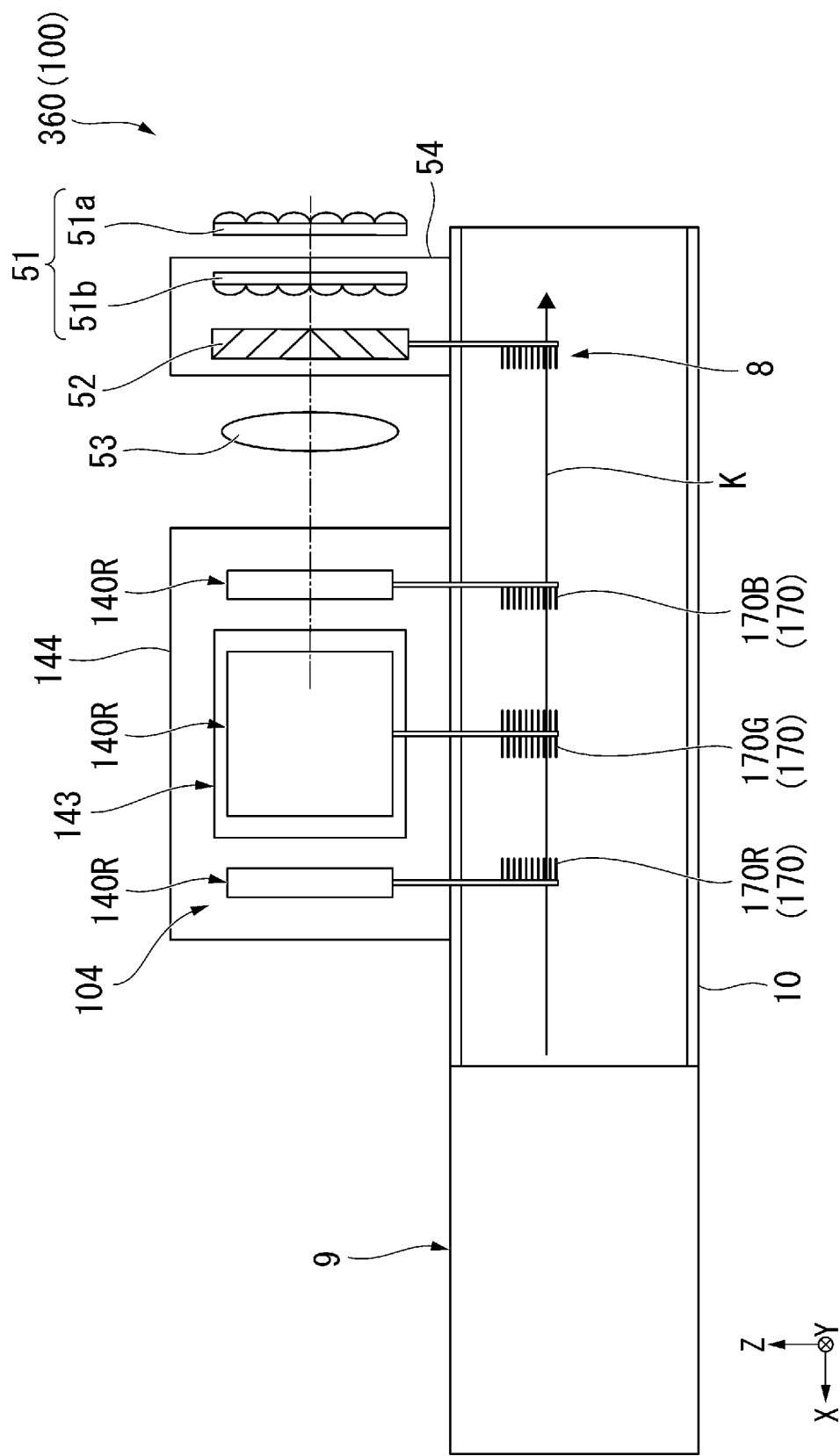
FIG. 11 is a perspective view showing a schematic configuration of a cooling mechanism according to the fourth embodiment.

FIG. 11 is a schematic diagram showing a general configuration of the cooling mechanism in the present embodiment.

As shown in FIG. 11, the cooling mechanism 360 has a first housing 144, the second housing 54, a first heat-transfer section 170, the second heat-transfer section 8, the first fan 9, and the first duct 10. In other words, the projector 100 according to the present embodiment is further provided with the first housing 144, the second housing 54, the first heat-transfer section 170, the second heat-transfer section 8, the first fan 9, and the first duct 10.

The first housing 144 in the present embodiment houses the plurality of light modulation panels 140 and the light combining element 143 as the constituent members of the image forming unit 104 in a sealed state.

The first heat-transfer section 170 receives heat from the light modulation panels 140B, 140G, and 140R housed in the first housing 144, and transfers the heat to the outside of the first housing 144. The first heat-transfer section 170 includes a first heat-transfer member 170B, a second heat-transfer member 170G, and a third heat-transfer member 170R.

The first heat-transfer member 170B is disposed in the blue-light modulation panel 140B. The first heat-transfer member 170B extends from the blue-light modulation panel 140B to the inside of the first duct 10, and conducts the heat from the blue-light modulation panel 140B.

The second heat-transfer member 170G is disposed in the green-light modulation panel 140G. The second heat-transfer member 170G extends from the green-light modulation panel 140G to the inside of the first duct 10, and conducts the heat from the green-light modulation panel 140G.

The third heat-transfer member 170R is disposed in the red-light modulation panel 140R. The third heat-transfer member 170R extends from the red-light modulation panel 140R to the inside of the first duct 10, and conducts the heat from the red-light modulation panel 140R.

As each of the heat-transfer members 170B, 170G, and 170R, there is used, for example, a heat pipe using evaporation and condensation of a cooling medium or a vapor chamber in addition to graphite or copper.

The second heat-transfer section 8 is disposed in the polarization conversion element 52 which generates the largest amount of heat in the second housing 54, extends from the polarization conversion element 52 to the inside of the first duct 10, and conducts the heat from the polarization conversion element 52.

According to the projector 100 related to the present embodiment, it is possible for the cooling mechanism 360 to release the heat of the light modulation panels 140B, 140G, and 140R housed in the first housing 144 in the first duct 10 using the first heat-transfer section 170, and at the same time, it is possible for the cooling mechanism 360 to release the heat of the polarization conversion element 52 housed in the second housing 54 in the first duct 10 using the second heat-transfer section 8.

Thus, it is possible to efficiently cool the light modulation panels 140B, 140G, and 140R, and the polarization conversion element 52.

Further, in the projector 100 according to the present embodiment, the image forming unit 104 including the light modulation panels 140B, 140G, and 140R is housed in the sealed space of the first housing 144, and the polarization conversion element 52 and the second lens array 51*b* are housed in the sealed space of the second housing 54. Therefore, even when a filter or the like is not used when smoke exists in the peripheral environment, dust and the smoke are prevented from adhering to the image forming unit 104, the polarization conversion element 52, and the second lens array 51*b*. Therefore, it is possible to prevent a deterioration of a display quality due to the adherence of the dust or the smoke to the image forming unit 104, the polarization conversion element 52, and the second lens array 51*b*.

It should be noted that in the projector 100 according to the present embodiment, it is possible to dispose the second fan 11 and the first heat exchanger 12 in the first housing 144. According to this configuration, since it becomes possible to circularly supply the cool air current K to the image forming unit 104 housed in the sealed state in the first housing 144, it becomes possible to efficiently cool the constituent members of the image forming unit 104 together with the first heat-transfer section 170.

It should be noted that although the description is presented illustrating the embodiments of the present disclosure, the present disclosure is not necessarily limited to the embodiments described above, but a variety of modifications can be added within the scope or the spirit of the present disclosure.

First Modified Example

Then, a first modified example of the projector will be described. The projector according to the present modified example is different in the configuration of the first heat-transfer section from the projector 1 according to the first embodiment, and the rest of the configuration is common to the projector according to the present modified example and the projector 1 according to the first embodiment. In the following description, the configuration of the first heat-transfer section will mainly be described, the members common to the present embodiment and the first embodiment will be denoted by the same reference symbols, and the description thereof will be omitted or simplified.

Figure 12:
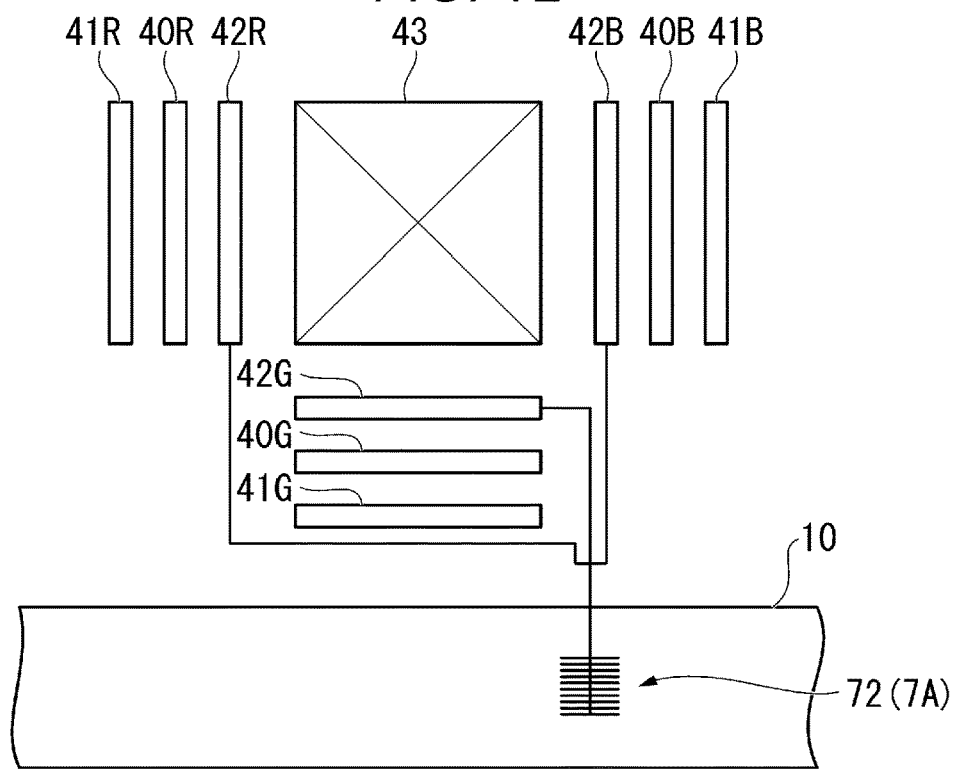
FIG. 12 is a schematic diagram of a heat-transfer path of a first heat-transfer section in a first modified example.

FIG. 12 is a diagram schematically showing a heat-transfer path in the first heat-transfer section in the present modified example.

As shown in FIG. 12, a first heat-transfer section 7A in the present modified example transfers heat from the exit side polarization plates 42B, 42G, and 42R out of the liquid crystal panels 40B, 40G, and 40R, the incident side polarization plates 41B, 41G, and 41R, and the exit side polarization plates 42B, 42G, and 42R. The first heat-transfer section 7A in the present modified example is formed of the polarization plate-heat-transfer member 72.

Here, out of the constituent members of the image forming unit 4, the exit side polarization plates 42B, 42G, and 42R are the largest in amount of heat generation. This is because the exit side polarization plates 42B, 42G, and 42R block polarized light which is other polarized light than predetermined polarized light, and which is not used as the image light, and thus, generate the heat.

In this regard, the first heat-transfer section 7A according to the present modified example cools the exit side polarization plates 42B, 42G, and 42R the largest in amount of heat generation, and can therefore efficiently cool the image forming unit 4 while reducing the device configuration in size.

It should be noted that although in the present modified example, when the single polarization plate-heat-transfer member 72 is made to extend from the exit side polarization plates 42B, 42G, and 42R to the inside of the first duct 10 is cited as an example, it is possible to make a plurality of polarization plate-heat-transfer members extend from the respective exit side polarization plates 42B, 42G, and 42R to the inside of the first duct 10.

Second Modified Example

Then, a second modified example of the projector will be described. The projector according to the present modified example is different in the configuration of the first heat-transfer section from the projector 1 according to the first embodiment, and the rest of the configuration is common to the projector according to the present modified example and the projector 1 according to the first embodiment. In the following description, the configuration of the first heat-transfer section will mainly be described, the members common to the present embodiment and the first embodiment will be denoted by the same reference symbols, and the description thereof will be omitted or simplified.

The first heat-transfer section in the present modified example has a plurality of panel-heat-transfer members respectively extending from the blue-liquid crystal panel 40B and the green-liquid crystal panel 40G to the inside of the first duct 10, and a plurality of polarization plate-heat-transfer members respectively extending from the at least one of the blue-incident side polarization plate 41B and the blue-exit side polarization plate 42B, and at least one of the green-incident side polarization plate 41G and the green-exit side polarization plate 42G to the inside of the first duct 10.

Figure 13:
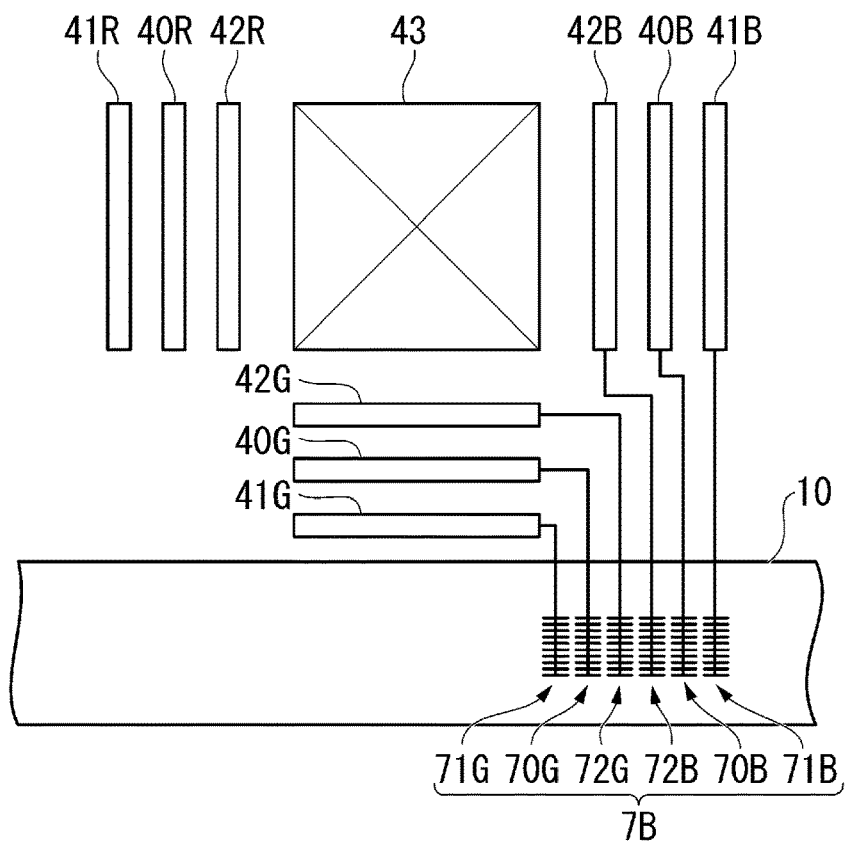
FIG. 13 is a schematic diagram of a heat-transfer path of a first heat-transfer section in a second modified example.

FIG. 13 is a diagram schematically showing a heat-transfer path in the first heat-transfer section in the present modified example. As shown in FIG. 13, the first heat-transfer section 7B in the present modified example is constituted by a first heat-transfer member 70B, a second heat-transfer member 70G, a fourth heat-transfer member 71B, a fifth heat-transfer member 71G, a seventh heat-transfer member 72B, and an eighth heat-transfer member 72G.

The seventh heat-transfer member 72B extends from the blue-exit side polarization plate 42B to the inside of the first duct 10, and conducts the heat from the blue-exit side polarization plate 42B.

The eighth heat-transfer member 72G extends from the green-exit side polarization plate 42G to the inside of the first duct 10, and conducts the heat from the green-exit side polarization plate 42G.

In other words, the first heat-transfer section 7B in the present modified example has the plurality of panel-heat-transfer members respectively extending from the liquid crystal panels 40B, 40G corresponding to a blue color and a green color, and the plurality of polarization plate-heat-transfer members respectively extending from the incident side polarization plates 41B, 41G and the exit side polarization plates 42B, 42G corresponding to the blue color and the green color.

It should be noted that in the present modified example, the first heat-transfer member 70B and the second heat-transfer member 70G correspond to a "plurality of panel-heat-transfer members," the fourth heat-transfer member 71B, the fifth heat-transfer member 71G, the seventh heat-transfer member 72B, and the eighth heat-transfer member 72G correspond to a "plurality of polarization plate-heat-transfer members."

Here, a degree of heat generation in each of the liquid crystal panels 40B, 40G, and 40R is different between the panels. For example, the green-liquid crystal panel 40G corresponding to the green light is larger in amount of heat generation than other liquid crystal panels 40B, 40R. This is because larger amount of light enters the green-liquid crystal panel 40G than the amount of light entering the liquid crystal panels 40B, 40R when taking the color balance of the illumination light WL into consideration.

Further, since the light in a short wavelength band and high in energy from the light source device 2 enters the blue-liquid crystal panel 40B corresponding to the blue light, the blue-liquid crystal panel 40B is required to have a higher light resistance compared to other liquid crystal panels 40R, 40G.

It should be noted that the difference in degree of heat generation in the wavelength band of light applies to the incident side polarization plates 41B, 41G, and 41R, and the exit side polarization plates 42B, 42G, and 42R.

In the first heat-transfer section 7B in the present modified example, it is possible to individually cool the green-liquid crystal panel 40G, the green-incident side polarization plate 41G, and the green-exit side polarization plate 42G corresponding to the green light the largest in amount of heat generation, and the blue-liquid crystal panel 40B, the blue-incident side polarization plate 41B, and the blue-exit side polarization plate 42B corresponding to the blue light high in energy with the heat-transfer members independent of each other. Thus, it is possible to increase the cooling efficiency of the image forming unit 4 while reducing the device configuration in size as much as possible.

It should be noted that although in the present modified example, when the heat-transfer members are provided respectively to the incident side polarization plates 41B, 41G and the exit side polarization plates 42B, 42G is cited as an example, it is possible to provide the heat-transfer member to only either one of the incident side polarization plates 41B, 41G and the exit side polarization plates 42B, 42G. For example, when the seventh heat-transfer member 72B and the eighth heat-transfer member 72G are provided to the exit side polarization plates 42B, 42G larger in amount of heat generation, it is possible to increase the cooling efficiency of the image forming unit while simplifying the device configuration.

Third Modified Example

Then, a third modified example of the projector will be described. The projector according to the present modified example is different in the configuration of the first heat-transfer section from the projector 1 according to the first embodiment, and the rest of the configuration is common to the projector according to the present modified example and the projector 1 according to the first embodiment. In the following description, the configuration of the first heat-transfer section will mainly be described, the members common to the present embodiment and the first embodiment will be denoted by the same reference symbols, and the description thereof will be omitted or simplified.

Figure 14:
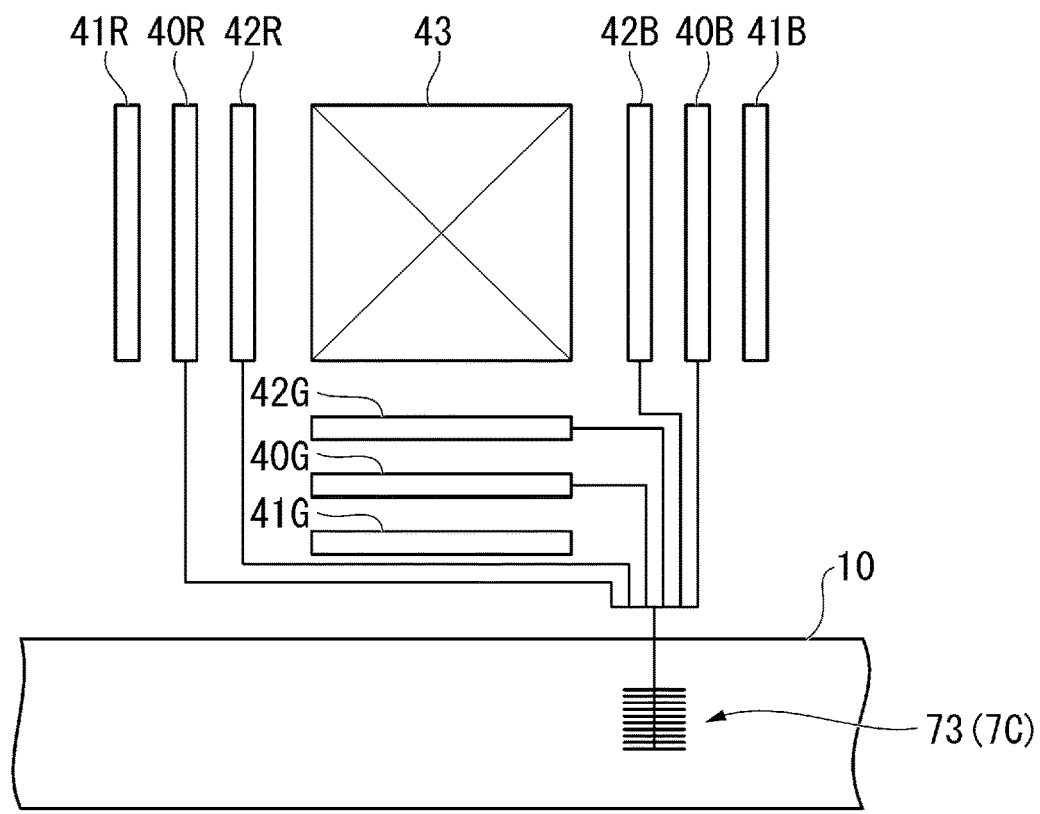
FIG. 14 is a schematic diagram of a heat-transfer path of a first heat-transfer section in a third modified example.

FIG. 14 is a diagram schematically showing a heat-transfer path in the first heat-transfer section in the present modified example. As shown in FIG. 14, the first heat-transfer section 7C in the present modified example has a single heat-transfer member 73 which receives the heat of the blue-liquid crystal panel 40B and the green-liquid crystal panel 40G, and the blue-exit side polarization plate 42B and the green-exit side polarization plate 42G, and which extends to the inside of the first duct 10.

Here, the incident side polarization plates 41B, 41G, and 41R are difficult to generate heat compared to the liquid crystal panels 40B, 40G, and 40R and the exit side polarization plates 42B, 42G, and 42R, and are smaller in amount of heat generation. This is because the incident side polarization plates 41B, 41G, and 41R transmit predetermined linearly-polarized light converted by the polarization conversion element 52, and therefore, the amount of heat generation due to light shielding is suppressed.

In the first heat-transfer section 7C in the present modified example, by omitting the heat-transfer members with respect to the incident side polarization plates 41B, 41G, and 41R relatively small in amount of heat generation, it is possible to achieve the simplification of the configuration. Further, it is possible for the first heat-transfer section 7C to efficiently cool the green-liquid crystal panel 40G and the green-exit side polarization plate 42G corresponding to the green light the largest in amount of heat generation, and the blue-liquid crystal panel 40B and the blue-exit side polarization plate 42B corresponding to the blue light high in energy with the single heat-transfer member 73. Thus, it is possible to increase the cooling efficiency of the image forming unit 4 without complicating the configuration.

Fourth Modified Example

Then, a fourth modified example of the projector will be described. The projector according to the present modified example is different in the configuration of the second heat-transfer section from the projector 1 according to the first embodiment, and the rest of the configuration is common to the projector according to the present modified example and the projector 1 according to the first embodiment. In the following description, the configuration of the second heat-transfer section will mainly be described, the members common to the present embodiment and the first embodiment will be denoted by the same reference symbols, and the description thereof will be omitted or simplified.

Figure 15:
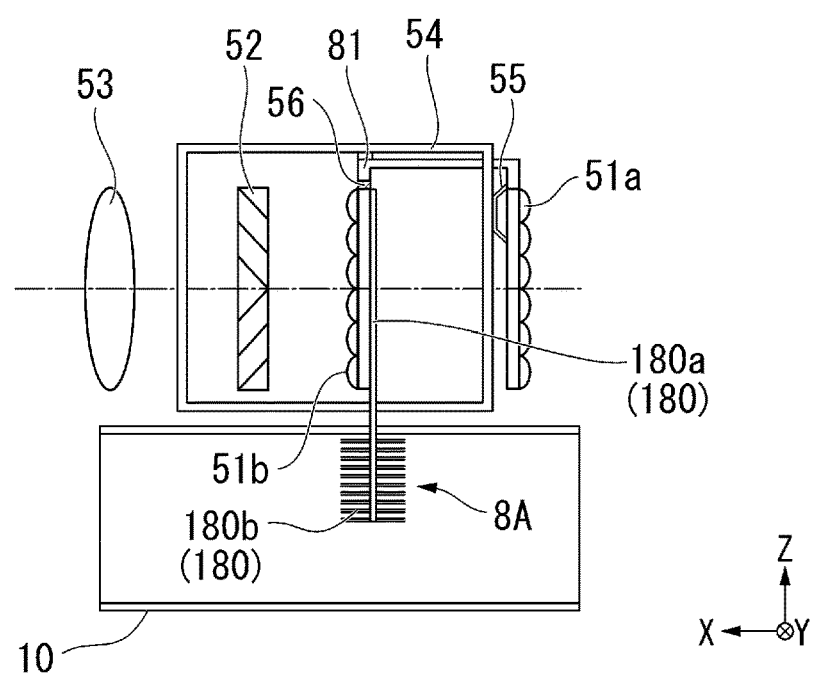
FIG. 15 is a schematic diagram of a heat-transfer path of a second heat-transfer section in a fourth modified example.

FIG. 15 is a diagram schematically showing a heat-transfer path in the second heat-transfer section in the present modified example. As shown in FIG. 15, the second heat-transfer section 8A in the present embodiment includes a single heat-transfer member 180. The heat-transfer member 180 includes a heat receiver 180a for receiving the heat of the second lens array 51b housed in the second housing 54, and a heat radiator 180b extending from the heat receiver 180a to the inside of the first duct 10. In the present modified example, the second lens array 51b is fixed to the support member 81 with an adhesive 56. On the other hand, the first lens array 51a is fixed to the support member 81 via a spring member 55.

In the second heat-transfer section 8A in the present modified example, by efficiently cooling the second lens array 51b with the heat-transfer member 180, it is possible to prevent heat conduction to the adhesive 56 for fixing the second lens array 51b to the support member 81. Thus, by preventing the deterioration of the adhesive 56 due to the heat, it is possible to stably fix the second lens array 51b in the second housing 54.

It should be noted that in the present modified example, when the heat-transfer member 180 conducts the heat from the second lens array 51b is cited as an example, but it is possible for the heat-transfer member 180 to conduct the heat from the polarization conversion element 52 in combination. In this case, a part of the heat receiver 180a is disposed at the plane of incidence of light side of the polarization conversion element 52.

Further, although in the embodiments and the modified examples described above, when the polarization conversion element 52 and the second lens array 51b each as a part of the homogenous illumination unit are housed in the sealed space in the second housing 54 is cited as an example, the present disclosure is not limited to this example. For example, it is possible to house the whole of the homogenous illumination unit 5 in the second housing 54, it is possible to house the homogenization optical element 51 and the polarization conversion element 52 in the second housing 54, it is possible to house only the homogenization optical element 51 in the second housing 54, or it is possible to house only the polarization conversion element 52 in the second housing 54. Further, it is possible to house one of the lens arrays of the homogenization optical element 51 alone in the second housing 54, or it is possible to house the polarization conversion element 52 and the superimposing lens 53 in the second housing 54.

A projector according to an aspect of the present disclosure may have the following configuration.

The projector according to an aspect of the present disclosure includes a light source device, a homogenization optical element configured to homogenize light emitted from the light source device, a polarization conversion element configured to align polarization of the light emitted from the homogenization optical element, at least one liquid crystal panel which the light emitted from the polarization conversion element enters, at least one incident side polarization plate disposed at a light incident side of the liquid crystal panel, at least one exit side polarization plate disposed at a light exit side of the liquid crystal panel, a projection optical system configured to project the light modulated by the liquid crystal panel, a first housing configured to house at least one of the liquid crystal pane, the incident side polarization plate and the exit side polarization plate in a sealed state, a second housing configured to house at least one of at least a part of the homogenization optical element and the polarization conversion element in a sealed state, a first heat-transfer section configured to receive heat from at least one of the liquid crystal panel, the incident side polarization plate, and the exit side polarization plate housed in the first housing, and configured to transfer the heat to an outside of the first housing, a second heat-transfer section configured to receive heat from at least one of at least a part of the homogenization optical element and the polarization conversion element housed in the second housing, and configured to transfer the heat to an outside of the second housing, a first fan configured to feed an air current toward the first heat-transfer section and the second heat-transfer section, and a first duct which extends from the first fan, and in which a part of the first heat-transfer section and a part of the second heat-transfer section are disposed.

In the projector according to the aspect described above, it is possible to adopt a configuration in which the first heat-transfer section is configured to transfer the heat from at least the exit side polarization plate out of the liquid crystal panel, the incident side polarization plate, and the exit side polarization plate.

In the projector according to the aspect described above, it is possible to adopt a configuration in which a plurality of the liquid crystal panels, a plurality of the incident side polarization plates, and a plurality of the exit side polarization plates are provided, the plurality of liquid crystal panels includes a blue-liquid crystal panel, a green-liquid crystal panel, and a red-liquid crystal panel, the plurality of incident side polarization plates includes a blue-incident side polarization plate, a green-incident side polarization plate, and a red-incident side polarization plate, the plurality of exit side polarization plates includes a blue-exit side polarization plate, a green-exit side polarization plate, and a red-exit side polarization plate, and the first housing houses the plurality of liquid crystal panels, the plurality of incident side polarization plates, the plurality of exit side polarization plates, and a light combining element configured to combine the light emitted from the plurality of liquid crystal panels in a sealed state.

In the projector according to the aspect described above, it is possible to adopt a configuration in which the first heat-transfer section is configured to transfer heat from at least one of at least one of the blue-liquid crystal panel and the green-liquid crystal panel, at least one of the blue-incident side polarization plate and the green-incident side polarization plate, and at least one of the blue-exit side polarization plate and the green-exit side polarization plate.

In the projector according to the aspect described above, it is possible to adopt a configuration in which the first heat-transfer section includes a plurality of panel-heat-transfer members respectively extending from at least the blue-liquid crystal panel and the green-liquid crystal panel to an inside of the first duct, and a plurality of polarization plate-heat-transfer members respectively extending from at least one of the blue-incident side polarization plate and the green-incident side polarization plate, and at least one of the blue-exit side polarization plate and the green-exit side polarization plate to the inside of the first duct.

In the projector according to the aspect described above, it is possible to adopt a configuration in which the first heat-transfer section includes a single heat-transfer member which is configured to receive heat from the blue-liquid crystal panel and the green-liquid crystal panel, and at least one of the blue-exit side polarization plate and the green-exit side polarization plate, and extends inside the first duct.

In the projector according to the aspect described above, it is possible to adopt a configuration in which the first heat-transfer section includes a first heat-transfer member extending from the blue-liquid crystal panel to the inside of the first duct, a second heat-transfer member extending from the green-liquid crystal panel to the inside of the first duct, and a single polarization plate-heat-transfer member extending from at least the blue-exit side polarization plate and the green-exit side polarization plate to the inside of the first duct.

In the projector according to the aspect described above, it is possible to adopt a configuration in which there are further included a second fan housed in the first housing, and a first heat exchanger configured to cool an air current fed in the first housing by the second fan.

In the projector according to the aspect described above, it is possible to adopt a configuration in which there are further included a second duct coupled to the first housing, a third fan configured to feed an air current in the first housing via the second duct, and a third duct configured to feed the air current discharged from the first housing to an inlet of the third fan.

In the projector according to the aspect described above, it is possible to adopt a configuration in which there is further included a second heat exchanger including a heat absorber configured to absorb heat from the air current flowing through the third duct, and a heat radiator disposed in the first duct.

In the projector according to the aspect described above, it is possible to adopt a configuration in which the second housing is configured to house at least the polarization conversion element, and the second heat-transfer section is configured to transfer heat of at least the polarization conversion element.

In the projector according to the aspect described above, it is possible to adopt a configuration in which the homogenization optical element is a pair of lens arrays.

In the projector according to the aspect described above, it is possible to adopt a configuration in which the second housing houses at least one of the lens arrays, the one of the lens arrays is fixed to a support member with an adhesive, and the second heat-transfer section transfers heat of the one of the lens arrays.

In the projector according to the aspect described above, it is possible to adopt a configuration in which another of the lens arrays is fixed to the support member via a spring member.

In the projector according to the aspect described above, it is possible to adopt a configuration in which the second housing houses a posterior lens array located at a posterior stage in the pair of lens arrays and the polarization conversion element located at a posterior stage of the posterior lens array, an anterior lens array located at an anterior stage in the pair of lens arrays is disposed in a light incident part of the second housing, an overlapping lens is disposed in a light exit part of the second housing, and the second heat-transfer section is configured to transfer heat of the polarization conversion element.

In the projector according to the aspect described above, it is possible to adopt a configuration in which there is further included a fourth fan configured to make an air current flow through the second housing, wherein the air current from the fourth fan flows along at least a surface of the polarization conversion element, and is then fed to an inlet of the fourth fan.

A projector according to another aspect of the present disclosure includes a light source device, a homogenization optical element configured to homogenize light emitted from the light source device, at least one light modulation panel which the light emitted from the homogenization optical element enters, a projection optical system configured to project the light modulated by the light modulation panel, a first housing configured to house the light modulation panel in a sealed state, a second housing configured to house at least a part of the homogenization optical element in a sealed state, a first heat-transfer section which is configured to receive heat from the light modulation panel, and which is configured to transfer the heat to an outside of the first housing, a second heat-transfer section which is configured to receive heat from the homogenization optical element housed in the second housing, and which is configured to transfer the heat to an outside of the second housing, a first fan configured to feed an air current toward the first heat-transfer section and the second heat-transfer section, and a first duct which extends from the first fan, and in which the first heat-transfer section and the second heat-transfer section are disposed.

In the projector according to the aspect described above, it is possible to adopt a configuration in which a plurality of the light modulation panels is provided, the plurality of light modulation panels includes a blue-light modulation panel, a green-light modulation panel, and a red-light modulation panel, and the first housing is configured to house alight combining element configured to combine light emitted from the blue-light modulation panel, the green-light modulation panel, and the red-light modulation panel in a sealed state.

What is claimed is:
1. A projector comprising:
a light source device;
a homogenization optical element configured to homogenize light emitted from the light source device;
a polarization conversion element configured to align polarization of the light emitted from the homogenization optical element;
at least one liquid crystal panel which the light emitted from the polarization conversion element enters;
at least one incident side polarization plate disposed at a light incident side of the liquid crystal panel;
at least one exit side polarization plate disposed at a light exit side of the liquid crystal panel;
a projection optical system configured to project the light modulated by the liquid crystal panel;
a first housing configured to house at least one of the liquid crystal panel, the incident side polarization plate and the exit side polarization plate in a sealed state;
a second housing configured to house at least one of at least a part of the homogenization optical element and the polarization conversion element in a sealed state;
a first heat-transfer section configured to receive heat from at least one of the liquid crystal panel, the incident side polarization plate, and the exit side polarization plate housed in the first housing, and configured to transfer the heat to an outside of the first housing;
a second heat-transfer section configured to receive heat from at least one of at least a part of the homogenization optical element and the polarization conversion element housed in the second housing, and configured to transfer the heat to an outside of the second housing;
a first fan configured to feed an air current toward the first heat-transfer section and the second heat-transfer section; and a first duct which extends from the first fan, and in which a part of the first heat-transfer section and a part of the second heat-transfer section are disposed.

2. The projector according to claim 1, wherein the first heat-transfer section is configured to transfer the heat from at least the exit side polarization plate out of the liquid crystal panel, the incident side polarization plate, and the exit side polarization plate.

3. The projector according to claim 1, wherein a plurality of the liquid crystal panels, a plurality of the incident side polarization plates, and a plurality of the exit side polarization plates are provided,
the plurality of liquid crystal panels includes a blue-liquid crystal panel, a green-liquid crystal panel, and a red-liquid crystal panel,
the plurality of incident side polarization plates includes a blue-incident side polarization plate, a green-incident side polarization plate, and a red-incident side polarization plate,
the plurality of exit side polarization plates includes a blue-exit side polarization plate, a green-exit side polarization plate, and a red-exit side polarization plate, and
the first housing houses the plurality of liquid crystal panels, the plurality of incident side polarization plates, the plurality of exit side polarization plates, and a light combining element configured to combine the light emitted from the plurality of liquid crystal panels in a sealed state.

4. The projector according to claim 3, wherein the first heat-transfer section is configured to transfer heat from at least one of at least one of the blue-liquid crystal panel and the green-liquid crystal panel, at least one of the blue-incident side polarization plate and the green-incident side polarization plate, and at least one of the blue-exit side polarization plate and the green-exit side polarization plate.

5. The projector according to claim 3, wherein the first heat-transfer section includes
a plurality of panel-heat-transfer members respectively extending from at least the blue-liquid crystal panel and the green-liquid crystal panel to an inside of the first duct, and
a plurality of polarization plate-heat-transfer members respectively extending from at least one of the blue-incident side polarization plate and the green-incident side polarization plate, and at least one of the blue-exit side polarization plate and the green-exit side polarization plate to the inside of the first duct.

6. The projector according to claim 3, wherein the first heat-transfer section includes a single heat-transfer member which is configured to receive heat from the blue-liquid crystal panel and the green-liquid crystal panel, and at least one of the blue-exit side polarization plate and the green-exit side polarization plate, and extends inside the first duct.

7. The projector according to claim 3, wherein the first heat-transfer section includes
a first heat-transfer member extending from the blue-liquid crystal panel to the inside of the first duct,
a second heat-transfer member extending from the green-liquid crystal panel to the inside of the first duct, and
a single polarization plate-heat-transfer member extending from at least the blue-exit side polarization plate and the green-exit side polarization plate to the inside of the first duct.

8. The projector according to claim 1, further comprising:
a second fan housed in the first housing; and
a first heat exchanger configured to cool an air current fed in the first housing by the second fan.

9. The projector according to claim 1, further comprising:
a second duct coupled to the first housing;
a third fan configured to feed an air current in the first housing via the second duct; and
a third duct configured to feed the air current discharged from the first housing to an inlet of the third fan.

10. The projector according to claim 9, further comprising:
a second heat exchanger including a heat absorber configured to absorb heat from the air current flowing through the third duct, and a heat radiator disposed in the first duct.

11. The projector according to claim 1, wherein the second housing is configured to house at least the polarization conversion element, and
the second heat-transfer section is configured to transfer heat of at least the polarization conversion element.

12. The projector according to claim 1, wherein the homogenization optical element is a pair of lens arrays.

13. The projector according to claim 12, wherein the second housing houses at least one of the lens arrays,
the one of the lens arrays is fixed to a support member with an adhesive, and
the second heat-transfer section transfers heat of the one of the lens arrays.

14. The projector according to claim 13, wherein another of the lens arrays is fixed to the support member via a spring member.

15. The projector according to claim 12, wherein the second housing houses a posterior lens array located at a posterior stage in the pair of lens arrays and the polarization conversion element located at a posterior stage of the posterior lens array,
an anterior lens array located at an anterior stage in the pair of lens arrays is disposed in a light incident part of the second housing,
an overlapping lens is disposed in a light exit part of the second housing, and
the second heat-transfer section is configured to transfer heat of the polarization conversion element.

16. The projector according to claim 15, further comprising:
a fourth fan configured to make an air current flow through the second housing, wherein
the air current from the fourth fan flows along at least a surface of the polarization conversion element, and is then fed to an inlet of the fourth fan.

17. A projector comprising:
a light source device;
a homogenization optical element configured to homogenize light emitted from the light source device;
at least one light modulation panel which the light emitted from the homogenization optical element enters;
a projection optical system configured to project the light modulated by the light modulation panel;
a first housing configured to house the light modulation panel in a sealed state;
a second housing configured to house at least a part of the homogenization optical element in a sealed state;

a first heat-transfer section which is configured to receive heat from the light modulation panel, and which is configured to transfer the heat to an outside of the first housing;

a second heat-transfer section which is configured to receive heat from the homogenization optical element housed in the second housing, and which is configured to transfer the heat to an outside of the second housing;

a first fan configured to feed an air current toward the first heat-transfer section and the second heat-transfer section; and a first duct which extends from the first fan, and in which the first heat-transfer section and the second heat-transfer section are disposed.

18. The projector according to claim 17, wherein a plurality of the light modulation panels is provided, the plurality of light modulation panels includes a blue-light modulation panel, a green-light modulation panel, and a red-light modulation panel, and the first housing is configured to house a light combining element configured to combine light emitted from the blue-light modulation panel, the green-light modulation panel, and the red-light modulation panel in a sealed state.

* * * * *